US010460234B2

(12) United States Patent
Chandran et al.

(10) Patent No.: US 10,460,234 B2
(45) Date of Patent: Oct. 29, 2019

(54) PRIVATE DEEP NEURAL NETWORK TRAINING

(71) Applicant: Microsoft Technology Licensing, LLC, Redmond, WA (US)

(72) Inventors: Nishanth Chandran, Bangalore (IN); Divya Gupta, Redmond, WA (US); Sameer Wagh, Princeton, NJ (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 40 days.

(21) Appl. No.: 15/917,091

(22) Filed: Mar. 9, 2018

(65) Prior Publication Data

US 2019/0228299 A1 Jul. 25, 2019

Related U.S. Application Data

(60) Provisional application No. 62/619,451, filed on Jan. 19, 2018.

(51) Int. Cl.
*G06F 1/02* (2006.01)
*G06N 3/08* (2006.01)
(Continued)

(52) U.S. Cl.
CPC ................. *G06N 3/08* (2013.01); *G06F 1/02* (2013.01); *G06F 17/13* (2013.01); *G06F 17/16* (2013.01); *G06N 3/04* (2013.01)

(58) Field of Classification Search
CPC .............. G06F 1/02; G06F 17/13; G06N 3/08
See application file for complete search history.

(56) References Cited

U.S. PATENT DOCUMENTS

2004/0179686 A1* 9/2004 Matsumura ............. H04L 9/085 380/44
2014/0173270 A1* 6/2014 Matsuo ................. H04L 9/0869 713/150

(Continued)

OTHER PUBLICATIONS

Mohassel, et al., "SecureML: A System for Scalable Privacy Preserving", In Cryptology ePrint Archive, Report 2017/396, Dec. 11, 2017, pp. 1-38.

*Primary Examiner* — Chuong D Ngo
(74) *Attorney, Agent, or Firm* — Schwegman Lundberg & Woessner, P.A.

(57) ABSTRACT

Systems and methods for private deep neural network training are disclosed. Method includes storing first private values at first machine and second private values at second machine; providing, to third machine, first share of first private values and first share of second private values; providing, to fourth machine, second share of first private values and second share of second private values; computing, at third machine, third machine-value based on first share of first private values and first share of second private values; computing, at fourth machine, fourth machine-value based on second share of first private values and second share of second private values; providing, to first machine and second machine, third machine-value and fourth machine-value; and computing, at first machine, a mathematical function of first private values and second private values, mathematical function being computed based on first private values stored at first machine, third machine-value, and fourth machine-value.

14 Claims, 4 Drawing Sheets

(51) Int. Cl.

| | |
|---|---|
| ***G06N 3/04*** | (2006.01) |
| ***G06F 17/13*** | (2006.01) |
| ***G06F 17/16*** | (2006.01) |

(56) References Cited

U.S. PATENT DOCUMENTS

2016/0253514 A1* 9/2016 Wu .................... G06F 21/6245
726/30
2019/0034793 A1* 1/2019 Kataria .................... G06N 3/08
2019/0073581 A1* 3/2019 Chen ........................ G06N 3/08

* cited by examiner

PRIVATE DEEP NEURAL NETWORK TRAINING

PRIORITY CLAIM

This application claims priority to U.S. Provisional Patent Application No. 62/619,451, filed on Jan. 19, 2018, entitled "PRIVATE DEEP NEURAL NETWORK TRAINING," the entire content of which is incorporated herein by reference.

BACKGROUND

Different machines from a set of multiple machines store different private data, which may not be sharable between the machines. For example, each hospital in a set of hospitals may have a computer that stores patient diagnosis and treatment information. The hospitals may be prevented, for best practice, privacy or legal reason, from sharing the information with one another. Training machine learning models based on the combined data at the multiple machines, without sharing the data among the machines, may be desirable.

BRIEF DESCRIPTION OF THE DRAWINGS

Some embodiments of the technology are illustrated, by way of example and not limitation, in the figures of the accompanying drawings.

SUMMARY

Figure 1:
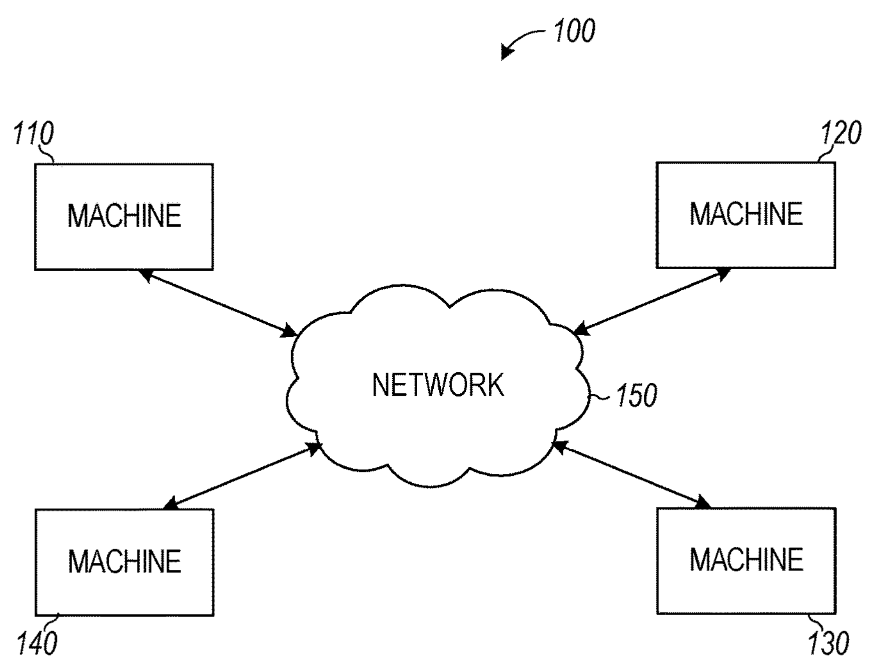
FIG. 1 illustrates an example system in which private deep neural network training may be implemented, in accordance with some embodiments.

The present disclosure generally relates to machines configured to provide private deep neural network (DNN) training, including computerized variants of such special-purpose machines and improvements to such variants, and to the technologies by which such special-purpose machines become improved compared to other special-purpose machines that provide technology for private DNN training. In particular, the present disclosure addresses systems and methods for training multiple machines to make computations based on private data stored at the multiple machines, without sharing the private data.

According to some aspects of the technology described herein, a method includes storing first private values at a first machine and second private values at a second machine. The method includes providing, to a third machine, a first share of the first private values and a first share of the second private values. The method includes providing, to a fourth machine, a second share of the first private values and a second share of the second private values. The method includes computing, at the third machine, a third machine value based on the first share of the first private values and the first share of the second private values. The method includes computing, at the fourth machine, a fourth machine value based on the second share of the first private values and the second share of the second private values. The method includes providing, to the first machine and the second machine, the third machine value and the fourth machine value. The method includes computing, at the first machine, a mathematical function of the first private values and the second private values, the mathematical function being computed based on the first private values stored at the first machine, the third machine value, and the fourth machine value. The method includes providing an output of the computed mathematical function.

According to some aspects of the technology described herein, a system includes processing circuitry and a memory storing instructions which, when executed by the processing circuitry, cause the processing circuitry to perform operations. The operations include storing, at a first machine, a first share of a first matrix and a first share of a second matrix. The operations include computing, at the first machine, a first machine product of the first share of the first matrix and the first share of the second matrix. The operations include storing, at a second machine, a second share of the first matrix and a second share of the second matrix. The operations include computing, at the second machine, a second machine product of the second share of the first matrix and the second share of the second matrix. The operations include providing, to a third machine, the first share of the first matrix and the second share of the second matrix. The operations include computing, at the third machine, a third machine product of the first share of the first matrix and the second share of the second matrix. The operations include providing, to a fourth machine, the second share of the first matrix and the first share of the second matrix. The operations include computing, at the fourth machine, a fourth machine product of the second share of the first matrix and the first share of the second matrix. The operations include computing a matrix product of the first matrix and the second matrix based on the first machine product, the second machine product, the third machine product, and the fourth machine product. The operations include providing an output representing the matrix product.

DETAILED DESCRIPTION

Overview

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

As set forth above, in some cases, different machines from a set of multiple machines store different private data, which may not be sharable between the machines. For example, each hospital in a set of hospitals may have a computer that stores patient diagnosis and treatment information. The hospitals may be prevented, for best practice, privacy or legal reason, from sharing the information with one another. Training machine learning models based on the combined data at the multiple machines, without sharing the data among the machines, may be desirable.

One problem addressed by the technology described herein is to jointly train a deep or convoluted neural network in a secure manner over data from multiple machines in such a way that no single machine learns any information about the data, aside from the trained model and the data previously stored at the machine. The output released is the final learned model itself. All the data is kept secure at the original machine(s) storing the data.

In a primitive solution, the multiple machines share the data with a trusted broker machine, and the broker machine then trains a model based on the data. The model is shared, from the trusted broker machine, to each of the multiple machine(s) and/or other interested parties. However, this primitive solution may not be practical in some cases. For instance, if the multiple machines store payroll data from different businesses or health data from different hospitals, sharing this data with a broker outside each business or hospital might not be practical for privacy and, in some cases, legal reasons.

Example Implementations

FIG. 1 illustrates an example system 100 in which private deep neural network training may be implemented, in accordance with some embodiments. As shown, the system 100 includes four machines 110, 120, 130, and 140, connected to one another via a network 150. The network 150 may include an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. Each of the machines 110, 120, 130, and 140 may include a server, a data repository, or a client device (e.g., a laptop computer, a desktop computer, a mobile phone, a tablet computer, a smart television, a smart watch, a digital music player, a personal digital assistant (PDA), and the like). While the system 100 is illustrated as including four machines 110, 120, 130, and 140, the technology described herein may be implemented with any number of machines, not necessarily four.

Some aspects of the technology described herein store an initial data set among four machines 110, 120, 130, and 140, with each machine storing a subset of the initial data set. This design enables a variety of different cryptographic techniques to come into play. These cryptographic techniques may include information-theoretic cryptographic techniques, which use elementary number theory to securely compute a variety of functions relevant for machine learning such as matrix multiplications, Rectified Linear Units, and the like. This may enable high-speed performance.

According to some embodiments, matrix multiplication is performed. A first machine 110 stores a first share of a first matrix and a first share of a second matrix. A second machine 120 stores a second share of the first matrix and a second share of the second matrix. The first matrix is constructible based on the first share of the first matrix and the second share of the first matrix. The second matrix is constructible based on the first share of the second matrix and the second share of the second matrix. The first machine 110 computes a first machine product of the first share of the first matrix and the first share of the second matrix. The second machine 120 computes a second machine product of the second share of the first matrix and the second share of the second matrix. The first machine 110 and the second machine 120 provide, to a third machine 130, the first share of the first matrix and the second share of the second matrix. The third machine 130 computes a third machine product of the first share of the first matrix and the second share of the second matrix. The first machine 110 and the second machine 120 provide, to a fourth machine 140, the second share of the first matrix and the first share of the second matrix. The fourth machine 140 computes a fourth machine product of the second share of the first matrix and the first share of the second matrix. A matrix product of the first matrix and the second matrix is computed based on the first machine product, the second machine product, the third machine product, and the fourth machine product.

One or more of the machines 110, 120, 130, and 140 may be a virtual machine. Alternatively, all of the machines 110, 120, 130, and 140 may be physical machines (e.g., physical server(s) or a physical data storage unit(s)).

Figure 2:
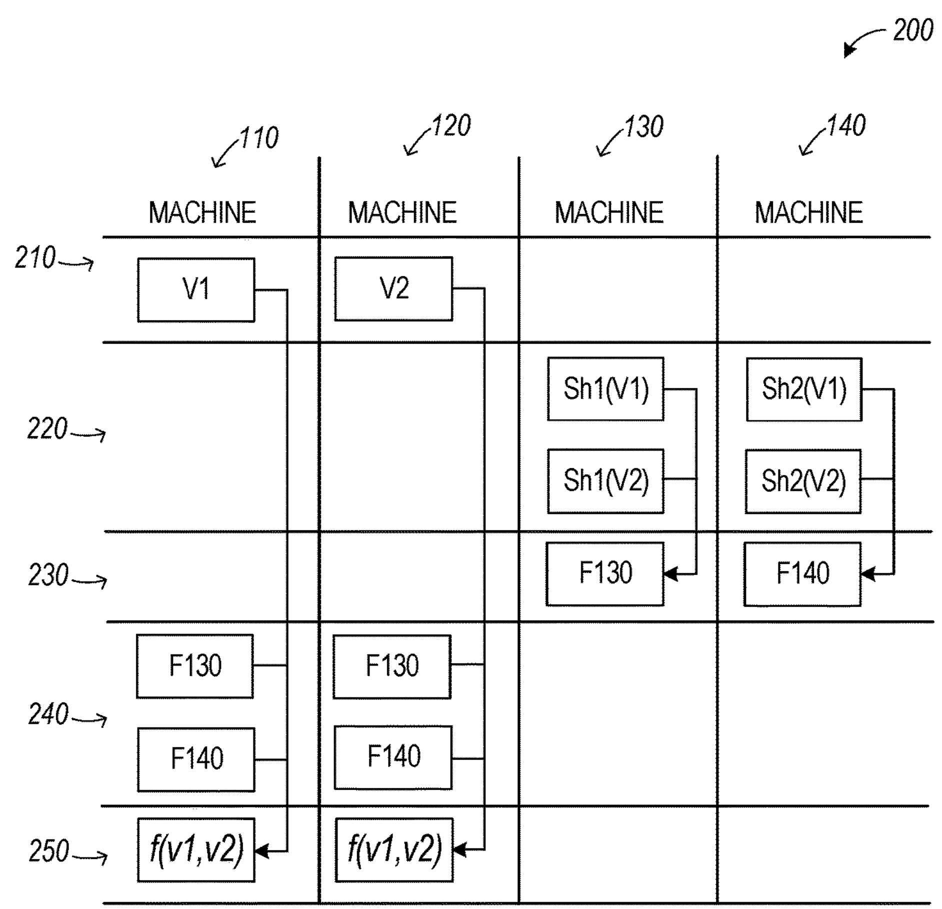
FIG. 2 illustrates an example data flow for computing a mathematical function based on private values stored at different machines, in accordance with some embodiments.

FIG. 2 illustrates an example data flow 200 for computing a mathematical function based on private values stored at different machines, in accordance with some embodiments. The four machines 110, 120, 130, and 140 from FIG. 1 are used in the data flow 200.

At operation 210, a first private value V1 is stored at the machine 110 and a second private value V2 is stored at the machine 120. The machine 110 lacks access to V2, and the machine 120 lacks access to V1.

At operation 220, the machines 110 and 120 provide, to the machine 130, a first share of the first private value Sh1(V1) and a first share (e.g., portion) of the second private value Sh1(V2). The machines 110 and 120 provide, to the machine 140, a second share of the first private value Sh2(V1) and a second share of the second private value Sh2(V2).

At operation 230, the machine 130 computes a value F130 based on Sh1(V1) and Sh2(V2), which are stored at the machine 130. The machine 140 computes a value F140 based on Sh2(V1) and Sh2(V2), which are stored at the machine 140.

At operation 240, the machines 130 and 140 provide the values F130 and F140 to the machines 110 and 120. In some cases, V1 is constructible based on Sh1(V1) and Sh2(V1), for example, using a second mathematical function. In some cases, V2 is constructible based on Sh1(V2) and Sh2(V2), for example, using the second mathematical function. The second mathematical function may be, for example, a sum or a product.

At operation 250, the machine 110 computes a mathematical function of V1 and V2, f(V1,V2), without knowing V2. The value of f(V1,V2) is computed, at the machine 110, based on V1, F130, and F140. Similarly, the machine 120 computes f(V1,V2) without knowing V1. The value of f(V1,V2) is computed, at the machine 120, based on V2, F130, and F140. At least one of the machines 110 and 120 may provide an output of the computed mathematical function f(V1,V2).

Figure 3:
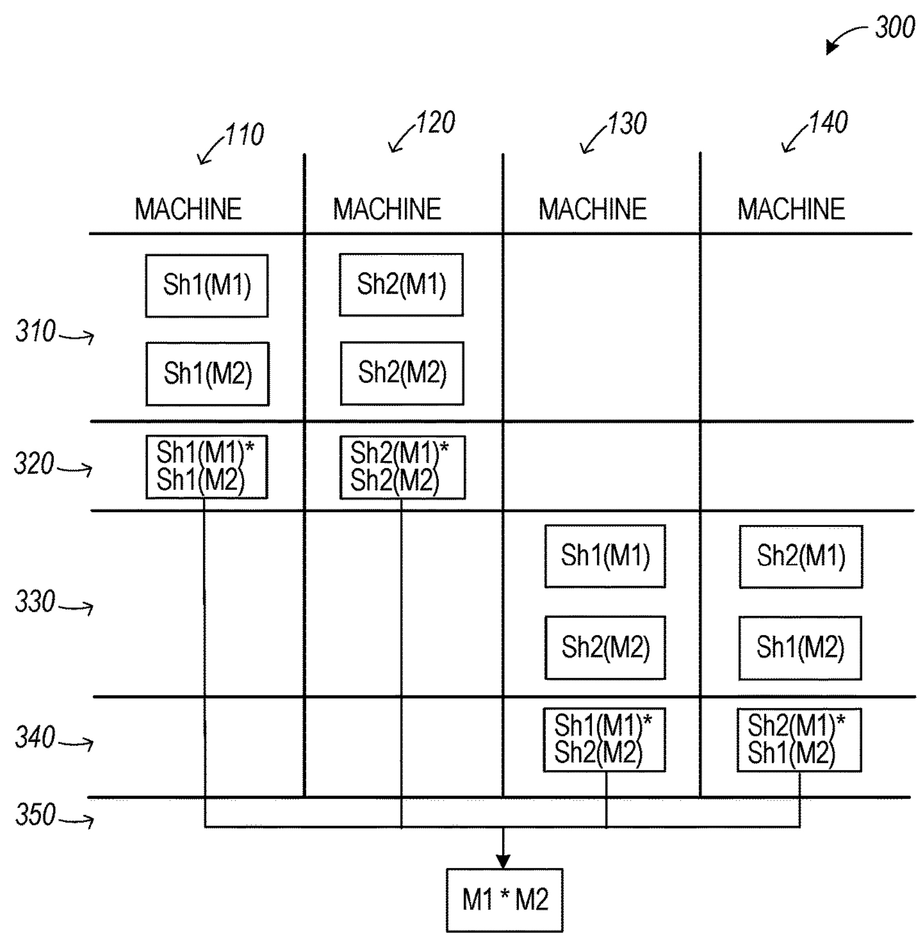
FIG. 3 illustrates an example data flow for multiplying matrices based on private values stored at different machines, in accordance with some embodiments.

FIG. 3 illustrates an example data flow 300 for multiplying (e.g., computing a cross product of) two matrices—a first matrix M1 and a second matrix M2—based on private values (e.g., contained in the matrices) stored at different machines, in accordance with some embodiments. The data flow 300 uses the machines 110, 120, 130, and 140 from FIG. 1. The technique of FIG. 3 may be implemented in conjunction with, in addition to, or in place of that of FIG. 2. As shown in FIG. 3, each of the machines 110 and 120 includes a share (e.g., portion) of the matrix M1 and a share of the matrix M2.

At operation 310, the machine 110 stores a first share of the first matrix Sh1(M1) and a first share of the second matrix Sh1(M2). The machine 120 stores a second share of the first matrix Sh2(M1) and a second share of the second matrix Sh2(M2). In some cases, M1 is constructible based on Sh1(M1) and Sh2(M1), for example, using a mathematical function. In some cases, M2 is constructible based on Sh1(M2) and Sh2(M2), for example, using the mathematical function. The mathematical function may be, for example, a sum or a product. In some cases, M1 and M2 include data to be processed, for example hospitals' data about patients. Sh1(M1) and Sh1(M2) may be the data of a first hospital. Sh2(M1) and Sh2(M2) may be the data of a second hospital. The two hospitals may wish to use their data together in order to have more data points and build a more accurate model. However, the two hospitals may resist sharing their data for privacy, best practice, and/or legal reasons.

At operation 320, the machine 110 computes a first machine product of Sh1(M1) and Sh1(M2)−Sh1(M1)*Sh1(M2). The machine 120 computes a second machine product of Sh2(M1) and Sh2(M2)−Sh2(M1)*Sh2(M2).

At operation 330, the machines 110 and 120 provide, to the machine 130, the values Sh1(M1) and Sh2(M2). The machines 110 and 120 provide, to the machine 140, the values Sh2(M1) and Sh1(M2).

At operation 340, the machine 130 computes a third machine product of Sh1(M1) and Sh2(M2)−Sh1(M1)*Sh2(M2). The machine 140 computes a fourth machine product of Sh2(M1) and Sh1(M2)−Sh2(M1)*Sh1(M2).

At operation 350, the matrix product of M1 and M2 [M1*M2] is computed based on the first machine product, the second machine product, the third machine product, and the fourth machine product based upon: [Sh1(M1)*Sh1(M2)], Sh2(M1)*Sh2(M2), Sh1(M1)*Sh2(M2), and Sh2(M1)*Sh2(M2). The machine products—Sh1(M1)*Sh1(M2), Sh2(M1)*Sh2(M2), Sh1(M1)*Sh2(M2), and Sh2(M1)*Sh2(M2)—are publicly shared, such that the matrix product M1*M2 may be computed at any of the machines 110, 120, 130, or 140. At least one of the machines 110, 120, 130, and 140 provides an output representing the matrix product M1*M2, while each of the machines 110 and 120 is able to maintain its private data without sharing the private data.

Deep Neural Networks (DNNs) provide a powerful method for machine learning training and prediction. For effective training, it may be desirable for multiple parties to combine their data for training—however, doing so conflicts with data privacy and security. Some aspects provide new secure multi-party protocols for various DNN building blocks such as matrix multiplication, Rectified Linear Units, normalization and so on. This enables construction of four-party information-theoretically secure protocols for DNN training and prediction such that no single party learns any information about the data. Some aspects train a 3-layer DNN over a data-set.

Neural networks have proven to be a very effective tool to produce predictive models that are widely used in applications such as healthcare, image classification, finance, and so on. The accuracy of many of these models have been known to be much better as more data is available. On the other hand, most data on which the neural networks are to be trained are sensitive and cannot be shared in the clear with other participants due to compliance requirements or proprietary reasons. It may be desirable to enable neural network training over distributed data such that each party's plaintext data is kept hidden from all other participants.

Cryptography and specifically secure multi-party computation (MPC) provides a framework to solve the above problem. However, using general purpose MPC for complex tasks such as neural network training leads to highly inefficient, sometimes even "impossible-to-execute" protocols.

Some aspects show that the price of security for neural network training algorithms can be surprisingly quite low. Specifically, some aspects include constructing a four-party secure computation protocol, whose overhead is only nine times that of training the same neural network over cleartext data. In fact, the security some aspects obtain is a very strong one—that of information-theoretic universally composable (UC) security (i.e., the adversary in the protocol is not restricted to be a probabilistic polynomial time algorithm and the protocols are secure under arbitrary composition).

In one model, four parties jointly hold the data that is to be computed upon. Some aspects do not require the data to be structured between these parties in any specific way. The four parties can be viewed as either the owners of data themselves or as four servers performing computation on behalf of a number of clients who send their data to them. In the latter setting, the clients must "secret-share" their data before sending it to the four servers. The four parties run a training algorithm (such as a Deep or Convolutional Neural Network) over the joint data by executing the MPC protocol. At the end, the parties obtain shares of the learned model—these shares can be reconstructed by the servers (or by any other party) to obtain the model in the clear. Some aspects provide information-theoretic security against one semi-honest corruption; i.e., no party, on its own, can learn any information from the protocol, even if it does not run in probabilistic polynomial time (PPT). It should be noted that this is the best corruption threshold that one could hope to obtain when dealing with computationally unbounded adversaries. Further, some aspects prove simulation security of the protocols in the Universal Composability (UC) framework.

Some aspects of the technology described herein provide protocols for various functionalities that have wide use in neural networks—e.g., matrix multiplication, comparison, Rectified Linear Unit (ReLU), division, normalization, max-pool and so on. These sub-protocols can be pieced together to implement many neural networks. In some cases, the price (e.g., in complexity) of MPC in neural network training can be as low as nine times that of the no-security baseline. Some protocols described herein have an overall execution time of roughly 3500 s in the Local Area Network (LAN) setting and 41,300 s in the Wide Area Network (WAN) setting. While providing protocols in the two-party setting with security against one honest-but-curious server, some schemes (unavoidably) only provide computational security. Some aspects provide protocols in the four-party setting with security against one honest-but-curious server, but provide information-theoretic security with orders of magnitude improvements in performance (note that if information-theoretic security with four parties is desired, then a corruption threshold of one is the maximum that one can obtain). Finally, some aspects include splitting the protocols into an offline (independent of data) and online phase. Some aspects eliminate expensive oblivious transfer protocols, which are another major source of overhead.

The protocols described herein maintain the invariant that $P_0$ and $P_1$ hold two-out-of-two shares of all intermediary computation values. First, implementing information-theoretic matrix multiplication over shares when four parties are involved is relatively straight-forward. If $X_0$ and $X_1$ are the shares of X and $Y_0$ and $Y_1$ are the shares of Y (for matrices X and Y of appropriate dimension and over an appropriate ring), some aspects have $P_0$ hold $X_0$; $Y_0$, $P_1$ hold $X_0$; $Y_1$, $P_2$ hold $X_1$; $Y_0$ and $P_3$ hold $X_1$, $Y_1$. Each party can now compute $X_iY_j$ (for appropriate i, j) locally and once these shares are re-randomized (using shares of the zero matrix), some aspects can ensure that $P_0$ and $P_1$ hold fresh shares of XY, without any party learning any information.

Some aspects include non-linear operations. One challenge is in computing the non-linear functions such as Relu'(x) (defined to be 1 if x>0 and 0 otherwise) and Relu(x) (defined to be max(x, 0)). Typical protocols for these tasks use techniques based on garbled circuits, resulting in both high communication overheads (proportional to a security parameter κ that is typically 128) as well as achieving only computational security. Some aspects compute these functions securely through a series of operations. Some aspects first define a functionality called private compare (denoted by $F_{PC}$). This three-party functionality assumes that $P_0$ and $P_1$ each have a share of the bits of l-bit value x (over some field $Z_p$) as well as a common random l-bit string r and a random bit β as input. This functionality computes the bit (x>r) (which is 1 if x>r and 0 otherwise) and XOR masks it with the bit β'. This output is given to the third party $P_2$.

While it may seem that such a comparison protocol should suffice to implement Relu'(x), unfortunately several barriers may be overcome. First, the above protocol uses bits of the l-bit x to be secret shared between $P_0$ and $P_1$ over a field $Z_p$. Some schemes could potentially execute the entire protocol over this field $Z_p$. however, this may lead to the following severe inefficiencies. To begin, the comparison protocol requires bits of x to be shared between $P_0$ and $P_1$. However, secure matrix multiplication is highly inefficient if it uses Boolean circuits (which it would have to if parties start out with shares of bits of x). To overcome this problem, some aspects define a four-party functionality (and provide a corresponding protocol), that is called FMSB (Four-party Most Significant Bit), that allows x to be secret shared as an element over a ring $Z_N$ and still computes the MSB(x). This protocol exploits the fact that computing the MSB of a value x over a ring $Z_N$ is equivalent to computing the LSB of 2x over the same ring as long as Ni s odd. It then makes use of the previous comparison protocol and the additional party to efficiently perform the comparison without actually having to convert x from its ring representation to bits, which is how the efficiency gains are obtained.

Now, the protocol may be executed over the ring $Z_N$ with N being odd. However doing so is fairly inefficient as matrix multiplication over the ring $Z_2^{64}$ (or $Z_2^{32}$) is much faster. This is because native implementation of matrix multiplication over long (or int) automatically implements the modulo operation over $Z_2^{64}$ (or $Z_2^{32}$) and some libraries heavily optimize matrix multiplication over these rings, which give significant efficiency improvements compared to operations over any other ring. Some aspects provide a protocol that converts values (≠L−1) that are secret shared over $Z_L$ into shares over $Z_{L-1}$. This protocol may be of independent interest.

Finally, this design enables some aspects to do run the comparison protocol (the protocol that realizes $F_{PC}$ above) over a small field $Z_p$ (e.g., p=67 concretely) and this reduces the communication complexity of the protocol. Using all these protocols, the protocol for computing Relu'(x) may be obtained.

Now, having constructed a protocol that computes Relu'(x), some aspects construct a protocol (called select shares) that uses the protocol for Relu'(x) to compute Relu(x) in an efficient manner. This functionality (and protocol) can be seen as an efficient variant of the oblivious transfer functionality in the four-party setting.

Turning to division, many neural networks make use of the division operation at the end of forward propagation in order to normalize the values. To provide for this, some aspects make use of the sub-protocols described earlier to construct an information-theoretic secure division protocol.

Some aspects develop efficient protocols to perform Deep Neural Network (DNN) training over joint data. The results are in the setting where 4 parties ($P_0$, $P_1$, $P_2$, $P_3$) hold the data jointly—some aspects do not require the data to be structured between these parties in any specific way. Some aspects view each $P_j$ as either a data owner taking part in the computation or some aspects can have data owners secret share their data to four servers doing the computation. These four parties execute the MPC protocol disclosed herein and, at the end of the protocol, hold shares of the final learned model. The shares can be reconstructed by any party that needs to learn the trained model in the clear or the shared model can then be used to run prediction algorithms, once again using the MPC protocol.

As an example, consider a smart phone application which tracks sensitive user data (sleep pattern, health data, and so on). Each user only has access to his or her own data which frequently is not sufficient to train a good classifier that can detect sleep anomalies or other irregular health behavior. However, users together have sufficient data to train a model. The users could share their data to a central party who can then learn a model. Unfortunately, this approach has the drawback that this central party learns the sensitive data of all users. In some of the models described herein, each user can simply secret share his or her data across the four parties and the parties can learn the model amongst themselves using the MPC protocol (the model learned is also secret shared among them). Finally, to use the trained model for prediction, the user sends his or her input in a secret shared manner to the four parties and the four parties can once again execute the MPC protocol to return the results of the prediction. This ensures that no single party ever sees the user's sensitive data in the clear.

Some aspects are directed to Deep Neural Network (DNN) training algorithms. Some aspects consider a three-layer DNN trained. The dimensions of the DNN are: (input) 784×128×128×10 (output) and each layer is fully connected. Some aspects use a standard one hot encoding for the output classification. At a very high level, every layer in the forward propagation comprises of a linear operation (such as matrix multiplication in the case of fully connected layers and convolution in the case of Convolutional Neural Networks, where weights are multiplied by the activation), followed by a (non-linear) activation function f. One of the most popular activation functions is the Rectified Linear Unit (ReLU) defined as Relu(x)=max(0, x). Usually, the softmax function, defined as $$SM(u_i) = \frac{e^{-u_i}}{\sum e^{-u_i}}$$

is applied to the output of the last layer. This function, being hard to compute cryptographically in a secure manner, is approximated by the function $$ASM(u_i) = \frac{Relu(u_i)}{\sum Relu(u_i)}.$$

The idea behind the SM function is to convert the output values into a probability distribution—the same effect being also achieved by the ASM function. The backward propagation updates the weights appropriately making use of derivative of the activation function (in this case Relu'(x), which is defined to be 1 if x>0 and 0 otherwise) and matrix multiplication. Some aspects extend to any network (which includes size and type) which relies on ReLU's, normalization, division, and the like. The aspects described here are provided as examples only and do not restrict the technology described herein. For instance, the technology is not specific to a three-layer neural network and may be used with an n-layer neural network, where n is any positive integer.

Some aspects denote by l a generic layer of the network, where $1 \le l \le L$. Some aspects use $w_{jk}^l$ to denote the weight of the connection from $k^{th}$ neuron in the $(l-1)^{th}$ layer to neuron $j^{th}$ in the $l^h$ layer. Some aspects use $a_j^l, b_j^l$ for the activation and bias of the $j^{th}$ neuron in the $l^{th}$ layer. Some aspects also define $z_j^l = \Sigma_k w_{jk}^l a_k^{l-1} + b_k^l$ for notational convenience. Some aspects use $y_j$ to denote the output.

Some aspects drop the lower indices to denote the corresponding vector/matrix—for instance, $w^l$ denotes the weight matrix between the $(l-1)^{th}$ and $l^{th}$ layer, whereas $w_{jk}^l$ denote individual values. The cost function used is the cross entropy function and is given by:

$$C = -\frac{1}{n}\sum_s \sum_j (y_j \ln a_j^L + (1 - y_j)\ln(1 - a_j^L)) \tag{1}$$

where n is the number of samples and s is a generic sample. The forward propagation is governed by the following equation:

$$a_j^l = \sigma(z_j^l) = \sigma\left(\sum_k w_{jk}^l a_k^{l-1} + b_k^l\right) \tag{2}$$

where σ is the non-linear operation, in the case Relu(•). Using Θ to denote Hadamard product (element wise product) some aspects define $\delta_j^l$ as the error of neuron j in layer l and is given by $\partial C / \partial z_j^l$. The backward propagation equations are an approximation of actual gradients given that the forward pass contains ASM(•). The backward propagation equations are faithful to sigmoid function as the last layer activation function [sigmoid function is given by $f(x)=1\sim(1+e^{-x})$] and are given by the following four equations:

$$\delta^L = a^L - y \tag{3a}$$

$$\delta^l = (w^{l+1})^T \delta^{l+1} \Theta Relu'(z^1) \tag{3b}$$

$$\frac{\partial C}{\partial b_j^l} = \delta_j^l \tag{3c}$$

$$\frac{\partial C}{\partial w_{jk}^l} = a_k^{l-1} \delta_j^l \tag{3d}$$

Equation (3a) computes the error of the last layer. Equation (3b) gives a way of computing the errors for layer l in terms of the errors for layer l+1, the weights $w^{l+1}$ and $z^l$. Finally, Equation (3c) and Equation (3d) give compute the gradients of the biases and weights respectively.

Stochastic Gradient Descent (SGD) is an iterative algorithm to minimize a function. Some aspects use SGD to train the DNN by initializing the weights to random values. In the forward pass, the network propagates from the inputs $a^1$ to compute the output y and in the backward pass the gradients are computed and the weights are updated. For efficiency reasons, instead of computing the forward and backward pass on each data sample, frequently a small set of samples are chosen randomly (called a mini-batch) and propagated together. The size of the mini-batch is denoted by B, set to 128 in this work. The complete algorithm is described in Algorithm 1.

Algorithm 1 includes the following components. Forward Pass (Lines 1 to 4): This is the forward propagation phase resulting in the output $a^L$ for each sample x. Normalization (Line 5): The final layer output $a^L$ is normalized according to the ASM(•) function. Final Layer Error (Line 6): This step computes the error for the final layer. Error Backprop (Lines 7 to 9): These set of equations back-propagate the error from the final layer to all the previous layers. Update Equations (Lines 10 to 13): These equations compute the gradients in terms of the errors and update the weights, biases accordingly.

Algorithm 1 DNN $\Pi_{ML}$:

Input: Inputs are read into $a^1$ one mini-batch at a time.

1. for l = 2: L do
2. $z^{x,l} = w^l a^{x,l-1} + b^l$
3. $a^{x,l} = \sigma(z^{x,l})$
4. end for
5. $ASM(a_i^L) = \frac{Relu(a_i^L)}{\sum Relu(a_i^L)}$
6. $\delta^{x,L} = ASM(a^{x,l}) - y^x$
7. for l = L - 1 : 2 do
8. $\delta^{x,l} = w^{l+1}\,\delta^{x,l+1} \Theta\, Relu'(z^{x,l})$
9. end for
10. for 1 = L : 2 do
11. $b^l \to b^l - \frac{\alpha}{|\beta|}\sum_x \delta^{x,l}$
12. $w^l \to w^l - \frac{\alpha}{|\beta|}\sum_x \delta^{x,l}(a^{x,l-1})^T$
13. end for As can be seen from the description of the training algorithm, the main functions that some aspects would need to compute securely are: matrix multiplication, Relu(•), division, ASM(•) (which can be computed from Relu(•) and division) and Relu(•). With these functions, one can run a secure MPC protocol for Algorithm 1 by piecing together these sub-protocols together.

Some aspects model and prove the security of the construction in the simulation paradigm. Some aspects provide a very high level formulation of security in this framework. All parties $P_1, \ldots, P_n$ (the specific focus is when n=4) are modelled as non-uniform interactive Turing machines (ITMs). Honest parties are restricted to run in probabilistic polynomial time (PPT). An adversary A, who interacts with and acts as instructed by the environment Z, "corrupts" a fraction of the parties; in the case of n=4, the adversary corrupts up to one of them. These corrupted parties are under the control of the adversary and the adversary can view all messages sent and received by these parties, as well as their individual random tapes, inputs and outputs (these collection of messages is referred to as the view of the party). However, all parties follow the protocol specification honestly (i.e., honest-but-curious security). The environment receives the complete view of all adversarial parties in the interaction. At the end of the interaction, the environment outputs a single bit. The environment and the adversary are not restricted to run in probabilistic polynomial time—i.e., some aspects provide information-theoretic security guarantees.

Some aspects define two interactions. In the real interaction, the parties run a protocol $\Pi$ in the presence of A and Z, with input z, $z \in \{0; 1\}^*$. Let $REAL_{\pi,A,Z}$ denote the binary distribution ensemble describing Z's output in this interaction. In the ideal interaction, parties send their inputs to an additional entity, a trusted functionality machine F that carries the desired computation truthfully. Let S (the simulator) denote the adversary in this idealized execution, and $IDEAL_{F,S,Z}$ the binary distribution ensemble describing Z's output after interacting with adversary S and ideal functionality F.

A protocol $\Pi$ is said to securely realize a functionality F if for every adversary A in the real interaction, there is an adversary S in the ideal interaction, such that no environment Z, on any input, can tell the real interaction apart from the ideal interaction, except with negligible probability (in the security parameter $\kappa$). In other words, if the two binary distribution ensembles above are statistically indistinguishable.

Finally, protocols may invoke other sub-protocols. In this framework the hybrid model is like a real interaction, except that some invocations of the sub-protocols are replaced by the invocation of an instance of an ideal functionality F; this is called the "F-hybrid model."

In order for neural network algorithms to be compatible with cryptographic applications, they must typically be encoded into integer form (most neural network algorithms work over floating point numbers). Now, decimal arithmetic must be performed over these values in an integer ring which requires careful detail. Some aspects follow the methodology described in detail below.

For number encoding, some aspects use fixed point arithmetic to perform all the computations required by the DNN. In other words, all numbers are represented as integers in the uint64_t native C++ datatype. Some aspects use a precision of $l_D=13$ bits for representing all numbers. In other words, an integer $2^{15}$ in this encoding corresponds to the float 4 and an integer $2^{64}-2^{13}$ corresponds to a float $-1$. Since some aspects use unsigned integers for encoding, Relu(•) compares its argument with $2^{63}$.

Some aspects perform decimal arithmetic in an integer ring. Addition of two fixed point decimal numbers is straightforward. To perform multiplication, some aspects multiply the two decimal numbers and truncate the last $l_D$ bits of the product. This truncation technique also works over shared secrets (2-out-of-2 shares) i.e., the two parties can simply truncate their shares locally preserving correctness with an error of at most one bit with high probability. Denoting an arithmetic shift by $\Pi_{AS}(a, \alpha)$, truncation of shares i.e., dividing shares by a power of 2 is described in Algorithm 2.

Algorithm 2 Truncate $\Pi_{Truncate}(\{P0, P1\})$:

Input: $P_0$ & $P_1$ hold an positive integer $\alpha$ and $\langle X \rangle_0^L$ & $\langle X \rangle_1^L$ resp.
Output: $P_0$ gets $\langle X/2^\alpha \rangle)_0^L$ and $P_1$ gets $\langle X/2^\alpha \rangle_1^L$.

-continued

Algorithm 2 Truncate $\Pi_{Truncate}(\{P0, P1\})$:

1: $P_0$ computes $\Pi_{AS}(\langle X \rangle_0^L, \alpha)$.
2: $P_1$ computes $-\Pi_{AS}(-\langle X \rangle_1^L, \alpha)$.

As described earlier, the main functions that some aspects would use to compute securely are: matrix multiplication, Relu(•), division, ASM(•) (which can be computed from Relu(•) and division) and Relu'(•). Below are described the various functionalities that are securely realized as building blocks for the final protocols that will compute the above functions.

In terms of notation, some aspects use additive secret sharing over the four rings $Z_L$, $Z_{L-1}$, $Z_p$ and $Z_2$, where $L=2^l$ and p is a prime. Note that $Z_{L-1}$ is a ring of odd size and $Z_p$ is a field. Some aspects use 2-out-of-2 secret sharing and use $(x)_0^t$ and $(x)_1^t$ denote the two shares of x over $Z_t$—specifically, the scheme generates $$r \xleftarrow{\$} Z_t,$$

sets $\langle x \rangle_0^t=r$ and $\langle x \rangle_1^t=x-r$. Some aspects also use $\langle x \rangle^t$ to denote sharing of x over $Z_t$ (the notation $\langle x \rangle^B$ is used to denote sharing of x over $Z_2$). The algorithm $Share^t(x)$ generates the two shares of x over the ring $Z_t$ and algorithm $Reconst^t(x_0, x_1)$ reconstructs a value x using $x_0$ and $x_1$ as the two shares over $Z_t$ (reconstruction is simply $x_0+x_1$ over $Z_t$). Also, for any l-bit integer x, some aspects use x[i] to denote the $i^{th}$ bit of x. Then, $\{\langle x[i] \rangle^t\}_{i \in [l]}$ denotes the shares of bits of x over $Z_t$. For an m×n matrix X, when $\langle X \rangle_0^t$ and $\langle X \rangle_1^t$ refer to the matrices that are created by secret sharing the elements of X component-wise (other notation on X, such as $Reconst^t(X_0, X_1)$ is similarly defined component-wise).

Turning to matrix multiplication, the first four-party functionality that some aspects describe computes matrix multiplication over secret shared values and secret shares the resultant product matrix amongst two parties. $P_0$ holds a pair $(X_0, Y_0)$ and $P_1$ holds a pair $(X_1, Y_1)$, where $X_0, X_1 \in Z_L^{m \times n}$ and $Y_0, Y_1 \in Z_L^{n \times v}$; $P_2$ and $P_3$ have no input. The functionality computes $X=Reconst^L(X_0, X_1)$, $Y=Reconst^L(Y_0, Y_1)$, $X \cdot Y \in Z_L^{m \times v}$, and then $(\langle X \cdot Y \rangle_0^L, \langle X \cdot Y \rangle_1^L) \leftarrow Share^t(X \cdot Y)$. It sends $\langle X \cdot Y \rangle_j^L$ to $P_j$, $j \in \{0,1\}$. The functionality is described below.

Functionality $F_{MATMUL}(\{P_0, P_1\}, P_2, P_3)$ $F_{MATMUL}$ interacts with parties $P_0$, $P_1$, $P_2$, $P_3$ & adversary S.

Inputs. Receive $(X_0, X_1)$ from $P_0$ and $(X_1, Y_1)$ from $P_1$, where $X_0, X_1 \in Z_t^{m \times n}$ and $Y_0, Y_1 \in Z_t^{n \times v}$.

Outputs. Compute:

$X=Reconst^t(X_0, X_1)$; $Y=Reconst^t(Y_0, Y_1)$ $X \cdot Y \in Z_t^{m \times v}$ $(\langle X \cdot Y \rangle_0^L, \langle X \cdot Y \rangle_1^L) \leftarrow Share^t(X \cdot Y)$.

Send $\langle X \cdot Y \rangle_j^L$ to $P_j$, $j \in \{0,1\}$.

Private compare is a three-party functionality involving $P_0$, $P_1$ and $P_2$. $P_0$ and $P_1$ have values in $Z_p$ that are viewed as shares of bits of an l-bit value x, an l-bit value r and a bit $\beta$ as input; $P_2$ has no input. Define (x>r) to be the bit that is 1 if x>r and 0 otherwise. The functionality takes all the above values as input from $P_0$ and $P_1$ and gives $\beta'=\beta \oplus (x>r)$ to $P_2$ as output. The functionality is described below.

Functionality $F_{PC}(\{P_0, P_1\}, P_2)$

FPC interacts with parties $P_0$, $P_1$, $P_2$, and adversary S.

Inputs. Receive ($\{x[i]_0\}_{i\in[l]}$, r, β) from $P_0$ and ($\{x[i]\}_{i\in[l]}$, r, β) from $P_1$, where for all i∈[i], $x[i]_0$, $x[i]_1 \in Z_p$, r is an l-bit integer and β∈{0,1}.

Outputs. Compute:

$x[i]=\text{Reconst}^p(x[i]_0, x[i]_1)$, ∀i|[l].

Let x be the l-bit (non-negative) integer defined by the l-bits $\{X[i]\}_{i\in[l]}$.

$\beta'=\beta\oplus(x>r)$.

Send β' to $P_2$.

Share convert is a four-party functionality. $P_0$ and $P_1$ have values in $Z_L$ as input, that are viewed as shares of value $a\in Z_L(a\neq L-1)$; $P_2$ and $P_3$ have no input. The functionality takes the shares as input from $P_0$ and $P_1$, reconstructs a, generates shares of a over $Z_{L-1}$ and gives $\langle a\rangle_0^{L-1}$ to $P_0$ and $\langle a\rangle_1^{L-1}$ to $P_1$ as output. The functionality is described below.

Functionality $F_{SC}(\{P_0, P_1\}, P_2, P_3)$ $F_{SC}$ interacts with parties $P_0$, $P_1$, $P_2$, $P_3$ and adversary S.

Inputs. Receive $a_0\in Z_L$ from $P_0$ and $a_1\in Z_L$ from $P_1$.

Outputs. Compute:

$a=\text{Reconst}^L(a_0, a_1)$.

$(\langle a\rangle_0^{L-1}, \langle a\rangle_1^{L-1})\leftarrow\text{Share}^{L-1}(a)$.

Send $\langle a\langle_j^{L-1}$ to $P_j$, j∈{0,1}.

Compute MSB is a four-party functionality where $P_0$ and $P_1$, as input, have values that are viewed as shares of $a\in Z_{L-1}$ (with $a\neq L-1$); $P_2$ and $P_3$ have no input. The functionality privately computes MSB(a) into shares across $P_1$ and $P_2$. The functionality is described below.

Functionality $F_{MSB}(\{P_0, P_1\}, P_2, P_3)$ $F_{MSB}$ interacts with parties $P_0$, $P_1$, $P_2$, $P_3$ and adversary S.

Inputs. Receive $a_0\in Z_{L-1}$ from $P_0$ and $a_1\in Z_{L-1}$ from $P_1$.

Outputs. Compute:

$a=\text{Reconst}^{L-1}(a_0, a_1)$.

Let α=MSB(a).

$(\langle\alpha\rangle_0, \langle\alpha\rangle_1^B)\leftarrow\text{Share}^B(\alpha)$.

Send $\langle\alpha\rangle_j^B$ to $P_j$, j∈{0,1}.

Select share is a four-party functionality where $P_0$ and $P_1$ hold values in $Z_t$ that are viewed as shares of $a\in Z_t$ as well as values that are viewed as shares of α∈{0, 1} as input; $P_2$ and $P_3$ have no input. The functionality takes the shares as input from $P_0$ and $P_1$, reconstructs a, computes αa and then generates shares (over $Z_t$) of this value as output to $P_0$ and $P_1$. The functionality is described below.

Functionality $F_{SS}(\{P_0, P_1\}, P_2, P_3)$ $F_{SS}$ interacts with parties $P_0$, $P_1$, $P_2$, $P_3$ and adversary S.

Inputs. Receive $(\alpha_0, a_0)$ from $P_0$ and $(\alpha_1, a_1)$ from $P_1$, where $\alpha_0, \alpha_1\in Z_B$ and $a_0, a_1\in Z_t$.

Outputs. Compute:

$a=\text{Reconst}^t(a_0, a_1)$ and $\alpha=\text{Reconst}^B(\alpha_0, \alpha_1)$.

Let b=αa.

$(\langle b\rangle_0^t, \langle b\rangle_1^t)\leftarrow\text{Share}^t(b)$.

Send $\langle b\rangle_j^t$ to $P_j$, j∈{0,1}.

Derivative of Relu is is a four-party functionality where $P_0$ and $P_1$, as input, have values that are viewed as shares of $a\in Z_L$; $P_2$ and $P_3$ have no input. The functionality takes the shares as input from $P_0$ and $P_1$, computes Relu'(a) (which is a bit that is 1 if MSB(a)=0 and 0 otherwise) and then generates Boolean shares of this bit as output to $P_0$ and $P_1$. The functionality is described below.

Functionality $F_{DRELU}(\{P_0, P_1\}, P_2, P_3)$ $F_{DRELU}$ interacts with parties $P_0$, $P_1$, $P_2$, $P_3$ and adversary S.

Inputs. Receive $a_0\in Z_L$ from $P_0$ and $a_1\in Z_L$ from $P_1$.

Outputs. Compute:

$a=\text{Reconst}^L(a_0, a_1)$.

Let $\alpha=1\oplus\text{MSB}(a)$.

$(\langle\alpha\rangle_0^B, \langle\alpha\rangle_1^B)\leftarrow\text{Share}^B(\alpha)$.

Send $\langle\alpha\rangle_j^B$ to $P_j$, j∈{0,1}.

Relu is a four-party functionality where $P_0$ and $P_1$, as input, have values that are viewed as shares of $a\in Z_L$; $P_2$ and $P_3$ have no input. The functionality takes the shares as input from $P_0$ and $P_1$, reconstructs a, computes Relu(a) (which is a if Relu'(a)=1 and 0 otherwise) and then generates shares of this value (over $Z_L$) as output to $P_0$ and $P_1$. The functionality is described below.

Functionality $F_{RELU}(\{P_0, P_1\}, P_2, P_3)$ $F_{RELU}$ interacts with parties $P_0$, $P_1$, $P_2$, $P_3$ and adversary S.

Inputs. Receive $a_0$ from $P_0$ and $a_1$ from $P_1$, where $a_0, a_1\in Z_L$.

Outputs. Compute:

$a=\text{Reconst}^L(a_0, a_1)$.

Let α=Relu'(α) and c=αa.

$(\langle c\rangle_0^L, \langle c\rangle_1^L)\leftarrow\text{Share}^L(c)$.

Send $\langle c\rangle_j^L$ to $P_j$, j∈{0,1}.

Division is is a four-party functionality where $P_0$ and $P_1$, as input, have values that are viewed as shares of x, $y\in Z_L$; $P_2$ and $P_3$ have no input. The functionality takes the shares as input from $P_0$ and $P_1$, reconstructs x and y. It computes z=x/y (which is defined to be ⌊x/y⌋, where x and y; y≠0 are non-negative integers) and then generates shares of z (over $Z_L$) as output to $P_0$ and $P_1$. The functionality is described below.

Functionality $F_{DIV}(\{P_0, P_1\}, P_2, P_3)$ $F_{DIV}$ interacts with parties $P_0$, $P_1$, $P_2$, $P_3$ and adversary S.

Inputs. Receive $(x_0, y_0)$ from $P_0$ and $(x_1, y_1)$ from $P_1$, where $x_0, x_1, y_0, y_1\in Z_L$.

Outputs. Compute:

$x=\text{Reconst}^L(x_0, x_1)$ and $y=\text{Reconst}^L(y_0, y_1)$.

Let $$z=\left\lfloor\frac{x}{y}\right\rfloor.$$

$(\langle Z\rangle_0^L, \langle Z\rangle_1^L)\leftarrow\text{Share}^L(z)$.

Send $\langle Z\rangle_j^L$ to $P_j$, j∈{0,1}.

Some building block protocols are used by some aspects. These protocols operate in a semi-honest simulation based security against a single corruption. In the following, it is assumed that parties $P_0$, $P_1$ (resp., $P_2$, $P_3$) hold shares of O (that can be generated using common randomness between pair of parties). These shares of O can be used to refresh the secret shares between them follows: Each party locally adds its share of O to the share that needs to be refreshed. When aspects use the term "fresh share" of some value x, aspects mean that the randomness used to generate the share of x has not been used anywhere else in the protocol. In the following, "party $P_i$ generates shares $\langle x\rangle_j^t$ j for j∈{0, 1} and sends to $P_j$ to means that party $P_I$ generates $(\langle x\rangle_0^t,\langle x\rangle_1^t)\leftarrow\text{Share}^t(x)$ and sends $\langle x\rangle_j^t$ to $P_j$ for j∈{0, 1}". In all the protocols, it is maintained that the invariant that parties $P_0$ and $P_1$ hold "fresh" shares of every intermediate value computed in the entire computation, with only the final value being reconstructed. Parties $P_2$ and $P_3$ take the role of "assistants" in all protocols and have no inputs to protocols.

For matrix multiplication, Algorithm 3 describes the four-party protocol for secure multiplication of matrices X and Y between parties $P_0$, $P_1$, $P_2$, $P_3$. The parties $P_0$ and $P_1$ hold shares of X and Y, where $X\in Z_L^{m\times n}$ and $Y\in Z_L^{n\times v}$; parties $P_2$ and $P_3$ have no input. At the end of the protocol, $P_0$ and $P_1$ learn shares of matrix X·Y. If $\langle X_j^L$, j∈{0,1}⟩ are the shares of X and $\langle Y\rangle_j^L$, j∈{0,1} are the shares of Y, $P_0$ sends $\langle X\rangle_0^L$ to P2 and $\langle Y\rangle_0^L$ to $P_3$; similarly, $P_1$ sends $\langle X\rangle_1^L$ to $P_2$ and $\langle Y\rangle_1^L$ to $P_3$. Now, every party computes the $\langle X\rangle_i^L$ j value that they can (and appropriately randomize these shares). Now, note that the sum of all shares held by all 4 parties is indeed X·Y. Hence, $P_2$ and $P_3$ can send their respective shares to $P_0$ and $P_1$ (after re-randomizing) to complete the protocol.

---

Algorithm 3 Mat. Mul. $\Pi_{MatMul}(\{P_0, P_1\}, P_2, P_3)$:

---

Input: $P_0$ & $P_1$ hold $(\langle X\rangle_0^L, \langle Y\rangle_0^L)$ & $(\langle X\rangle_1^L, \langle Y\rangle_1^L)$resp.
Output: $P_0$ gets $\langle X \cdot Y\rangle_0^L$ and $P_1$ gets $\langle X \cdot Y\rangle_1^L$.
Common Randomness: $P_0$ and $P_1$ as well as $P_2$ and $P_3$ hold shares of zero matrices over
$Z_L^{m\times v}$ resp.; i.e., $P_0$ holds $\langle 0^{m\times v}\rangle_0^L = U_0$, $P_1$ holds $\langle 0^{m\times v}\rangle_1^L = U_1$, $P_2$ holds $\langle 0^{m\times v}\rangle_0^L = V_0$, and $P_3$ holds $\langle 0^{m\times v}\rangle_1^L = V_1$
1: $P_0$ sends $\langle X\rangle_0^L$ to $P_2$ and $\langle Y\rangle_0^L$ to $P_3$.
2: $P_1$ sends $\langle Y\rangle_1^L$ to $P_2$ and $\langle X\rangle_1^L$ to $P_3$.
3: $P_2$ computes $\langle W\rangle_0^L = \langle X\rangle_0^L \cdot \langle Y\rangle_1^L + V_0$ and $P_3$ computes $\langle W\rangle_1^L = \langle X\rangle_1^L \cdot \langle Y\rangle_0^L + V_1$.
4: $P_2$ sends $\langle W\rangle_0^L$ to $P_0$ and $P_3$ sends $\langle W\rangle_1^L$ to $P_1$
5: $P_j, j \in \{0, 1\}$outputs $\langle Z\rangle_j^L = \langle X\rangle_j^L \langle Y\rangle_j^L + \langle W\rangle_j^L + U_j$.

---

Proof. First prove the correctness of the protocol, i.e. $\text{Reconst}^L(Z_0, Z_1)=XY$. To see this, observe that $\langle Z\rangle_0^L+\langle Z\rangle_1^L=\Sigma_{j=0}\langle X\rangle_j^L\cdot\langle Y\rangle_j^L+\langle W\rangle_j^L+U_j=\Sigma_{j=0,1}\langle X\rangle_j^L\cdot\langle Y\rangle_j^L+\langle W\rangle_j^L$ as $U_0+U_1=0^{m\times v}$). Now, $\Sigma_{j=0,1}\langle W\rangle_j^L=\Sigma_{j=0,1}\langle X\rangle_j^L\cdot\langle Y\rangle_{1-j}$ (since $V_0+V_1=0^{m\times v}$).
Therefore,
$\langle Z\rangle_0^L+\langle Z\rangle_1^L=\Sigma_{j=0,1}\langle X\rangle_j^L\cdot\langle Y\rangle_j^L+\langle X\rangle_j^L\cdot\langle Y\rangle_{j-1}^L=(\langle X\rangle_0^L+\langle X\rangle_1^L\cdot(\langle Y\rangle_0^L+\langle Y\rangle_1^L)=X\cdot Y$ First prove security of the protocol against corruption of either $P_2$ or $P_3$. Observe that $P_2$ and $P_3$ only observe $(\langle X\rangle_0^L, \langle Y\rangle_1^L)$ and $(\langle X\rangle_1^L, \langle Y\rangle_0^L)$ resp., which are fresh shares of X and Y and therefore, reveal no information about X or Y. Hence, these messages can be simulated by simply sending a pair of random matrices in $(Z_L^{m\times n}, Z_L^{n\times v})$. These are the only messages that $P_2$ and $P_3$ observe.

Now, to prove security against corruption of either $P_0$ or $P_1$. Party $P_j$; $j\in\{0; 1\}$ receive $\langle W\rangle_j^L$ respectively. However, these are fresh shares of $\langle X\rangle_0^L\cdot\langle Y\rangle_1^L+(X)_1^L\cdot(Y)_0^L$ as they have been randomized by the random $V_j$ matrix, respectively. Hence, they contain no information about X and Y and can be simulated by sending a random matrix in $Z_L^{m\times v}$.

Finally, $P_j$ outputs $\langle Z\rangle_j^L=\langle X\rangle_j^L\cdot\langle Y\rangle_j^L+\langle W\rangle_j^L+U_j$, which is a fresh random share of X·Y (as they have each been randomized by random matrix $U_j$) and contain no information about X and Y. This completes the proof.

For private compare, Algorithm 4 describes the three-party protocol realizing the functionality $F_{PC}$. The parties $P_0$ and $P_1$ holds shares of bits of x in $Z_p$, i.e., $\{\langle x[i]\rangle_0^P\}_{i\in[l]}$ and $\{\langle x[i]\rangle_1^P\}_{i\in[l]}$, respectively. $P_0$, $P_1$ also hold an l-bit integer r and a bit β. At the end of the protocol, $P_2$ learns a bit $\beta'=\beta\oplus(x>r)$. This protocol is based on the computationally-secure protocols for a similar functionality.

---

Algorithm 4 PrivateCompare $\Pi_{PC}(\{P_0, P_1\}, P_2)$:

---

Input: $P_0$, $P_1$ hold $\{\langle x[i]\rangle_0^P\}_{i\in[l]}$ and $\{\langle x[i]\rangle_1^P\}_{i\in[l]}$, respectively, a common input r (an l bit integer) and a common random bit β.
Output: $P_2$ gets a bit $\beta \oplus (x > r)$.
Common Randomness: $P_0$, $P_1$ hold l common random values $s_i \in Z_p^*$ for all $i \in [l]$ and a random permutation π for l elements.
1: For each , $j \in \{0,1\}$, $P_j$ executes Steps 2-6:
2: for $i = \{1, 2, \ldots, l\}$ do
3: $\langle w_i\rangle_j^P = \langle x[i]\rangle_j^P + (1 - j)r[i] - 2r[i]\langle x[i]\rangle_j^P$ 4: $$\langle c_i\rangle_j^p = (-1)^{\beta}((1-j)\cdot r[i] - \langle x[i]\rangle_j^p + j + \sum_{k=i+1}^{\ell} \langle w_k\rangle_j^p$$

-continued

---

Algorithm 4 PrivateCompare $\Pi_{PC}(\{P_0, P_1\}, P_2)$:

---

5: end for
6: Send $\{\langle d_i\rangle_j^P\}_i = \pi(\{s_i\langle c_i\rangle_j^P\}_i)$ to $P_2$
7: For all $i \in [l]$, $P_2$ computes $d_i = \text{Reconst}^P(\langle d_i\rangle_0^P, \langle d_i\rangle_1^P)$ and sets $\beta' = 1$ iff $\exists i \in [l]$ such that $d_i = 0$.
8: $P_2$ outputs β'.

---

Proof. To first prove correctness of the protocol, i.e., $\beta'=\beta\oplus(x>r)$ when for all $i\in[l]$, $x[i]:=\text{Reconst}^P(\langle x[i]\rangle_0^P, \langle [i]\rangle_1^P)\in\{0,1\}$. Treat x and r as l bit integers and x>r tells if x is greater [x>r iff the leftmost bit where x[i]≠r[i], x[i]=1] than r. Outline the proof for the case when β=0. The other case follows in a similar manner.

For each $i\in[l]$, define $w_i=\text{Reconst}^P(\langle w_i\rangle_0^P, \langle w_i\rangle_1^P)$. First, claim that $w_i=x[i]\oplus r[i]$. This is because $w[i]=x[i]+r[i]-2r[i]x[i]$.

For each $i\in[l]$, define $c_i=\text{Reconst}^P(\langle c_i\rangle_0^P, \langle c_i\rangle_1^P)$. Note that $$c[i] = r[i] - x[i] + 1 + \sum_{k=i+1}^{\ell} w_k.$$

Let i* be such that for all i>i*, x[i]=r[i] and x[i*]≠r[i*]. Claim that the following holds: For all i>i*, c[1]=1. This is because both r[i]−x[i] and $$\sum_{k=i+1}^{\ell} w_k$$

are 0. For i=i*, if x[i]=1, c[i]=0, else c[i]=2. For i<i*, c[i]>1. This is because r[i]−x[i] is either 1 or −1 and $$\sum_{k=i+1}^{\ell} w_k > 1.$$

For this step, require that there is no wrap around modulo p, which is guaranteed by p>l+2. This proves that x>r iff there exists a $i\in[l]$ such that c[i]=0. Finally, the last step of multiplying with random non-zero $s_i$ and permuting all the $s_ic_i$ preserves this characteristic.

Now to prove security of the protocol. First note that $P_0$ and $P_1$ receive no messages in the protocol and hence, the protocol is trivially secure against corruption of $P_0$ or $P_1$. Now, some aspects simulate the messages seen by $P_2$ given $P_2$'s output, namely β'. To do this, if β'=0, pick $$d_i \xleftarrow{\$} Z_p^*,$$

for all $i\in[l]$. If β'=1, then pick an $$i^* \xleftarrow{\$} [\ell],$$

set $d_{i^*}=0$ with all other $$d_i \xleftarrow{\$} Z_p^*.$$

Now, compute $(\langle d\rangle_0^P, \langle d\rangle_1^P) \leftarrow \text{Share}^P\langle d_i\rangle$ and send $\langle d_i\rangle_j^P$ for all $i \in [l]$, $j \in \{0, 1\}$ as the message from $P_1$ to $P_2$. This completes the simulation. To see that the simulation is perfect, observe that whether or not $\exists i^*$, with $d_{i^*}=0$ depends only on $\beta'$. Additionally, when $\beta'=1$, the index $i^*$ where $d_{i^*}=0$ is uniformly random in [l] due to the random permutation $\pi$. Finally, the non-zero $d_i$ values are randomly distributed over $Z^*_p$ since the $s_i$ values are random in $Z^*_p$. This completes the proof.

For share convert, Algorithm 5 describes the four-party protocol for converting shares over $Z_L$ to $Z_{L-1}$ realizing the functionality $F_{SC}$. In this algorithm, aspects use $\kappa=\text{wrap}(x, y, L)$ to denote $\kappa=1$ if $x+y \geq L$ over integers and 0 otherwise. That is, $\kappa$ denotes the wrap-around bit for the computation $x+y \bmod L$.

---

Algorithm 5 ShareConvert $\Pi_{sc}(\{P_0, P_1\}, P_2, P_3)$:

---

Input: $P_0$, $P_1$ hold $\langle a\rangle_0^L$ and $\langle a\rangle_1^L$, respectively such that $\text{Reconst}^L(\langle a\rangle_0^L, \langle a\rangle_1^L) \neq L-1$.
Output: $P_0$, $P_1$ get $\langle a\rangle_0^{L-1}$ and $\langle a\rangle_1^{L-1}$.
Common Randomness: $P_0$, $P_1$ hold a random bit $\eta''$, a random $r \in Z_L$, shares $\langle r\rangle_0^L, \langle r\rangle_1^L$, $\alpha = \text{wrap}(\langle r\rangle_0^L, \langle r\rangle_1^L, L)$ and shares of 0 over $Z_{L-1}$ denoted by u0 and u1.
1: For each $j \in \{0,1\}$, $P_j$ executes Steps 2-3
2: $\langle \tilde{a}\rangle_j^L = \langle a\rangle_j^L + \langle r\rangle_j^L$ and $\beta_j = \text{wrap}(\langle a\rangle_j^L, \langle r\rangle_j^L, L)$.
3: Send $\langle \tilde{a}\rangle_j^L$ to $P_2$.
4: $P_2$ computes $x = \text{Reconst}^L(\langle \tilde{a}\rangle_0^L), (\langle \tilde{a}\rangle_1^L)$ and $\delta = \text{wrap}(\langle \tilde{a}\rangle_0^L), (\langle \tilde{a}\rangle_1^L, L)$.
5: $P_2$ generates shares $\{\langle x[i]\rangle_j^p\}_{i\in[l]}$ and $\langle \delta\rangle_j^{L-1}$ for $j \in \{0,1\}$and sends to $P_j$.
6: $P_0$, $P_1$, $P_3$ call $F_{PC}(\{P_0,P_1\}, P_3)$ with $P_j$, $j \in \{0,1\}$ having input $(\{\langle x[i]\langle_j^p\}_{i\in[l]}, r, \eta'')$ and $P_3$ learns $\eta'$.
7. For $j \in \{0,1\}$, $P_3$ generates $\langle \eta'\rangle_j^{L-1}$ and sends to Pj.
8: For each $j \in \{0,1\}$, $P_j$ executes Steps 9-11
9: $\langle \eta\rangle_j^{L-1} = \langle \eta'\rangle_j^{L-1} + (1-j)\eta'' - 2\eta''\langle \eta'\rangle_j^{L-1}$
10: $\langle \theta\rangle_j^{L-1} = \beta_j + (1-j)\cdot(-\alpha-1) + \langle \delta\rangle_j^{L-1} + \langle \eta\rangle_j^{L-1}$
11: Output $\langle y\rangle_j^{L-1} = \langle a\rangle_j^L - \langle \theta\rangle_j^{L-1} + u_j$ (over $L-1$)

---

Lemma 3. Protocol $\Pi_{SC}(\{P_0, P_1\}, P_2, P_3)$ in Algorithm 5 securely realizes $F_{SC}$ in the $F_{PC}$-hybrid model.

Proof. First prove the correctness of the protocol, i.e., $\text{Reconst}^{L-1}(\langle y\rangle_0^{L-1}, \langle y\rangle_1^{L-1}) = \text{Reconst}^L(\langle a\rangle_0^L \langle a\rangle_1^L) = a$.

First, by correctness of functionality $F_{PC}$, $\eta' = \eta'' \oplus (x > r)$. Next, let $\eta = \text{Reconst}^{L-1}(\langle \eta\rangle_0^{L-1}, \langle \eta\rangle_1^{L-1}) = \eta' \oplus \eta'' = (x > r)$. Next, note that $x \equiv a+r \bmod L$. Hence, $\text{wrap}(a, r, L)=0$ iff $x>r$. By the correctness of wrap, following relations hold over the integers:

1) $r = \langle r\rangle_0^L + \langle r\rangle_1^L - \alpha L$.
2) $\langle \tilde{a}\rangle_j^L = \langle a\rangle_j^L + \langle r\rangle_j^L \beta_j L$.
3) $x = \langle \tilde{a}\rangle_0^L + \langle \tilde{a}\rangle_1^L - \delta L$.
4) $x = a + r - (1-\eta)L$.
5) Let $\theta$ be such that $a = \langle a\rangle_0^L + \langle a\rangle_1^L - \theta L$.

Computing, (1)−(2)−(3)+(4)+(5) gives us $\theta = \beta_0 + \beta_1 - \alpha + \delta + \eta - 1$. This is exactly, what the parties $P_0$ and $P_1$ calculate in Step 10 of Algorithm 5.

Note that above $\theta$ is the bit that denotes whether there is a wrap-around in original shares of a over $Z_L$. If there is a wrap-around ($\theta=1$), to compute the new shares over $Z_{L-1}$, some aspects may want to decrement the shares by 1. Otherwise, the original shares over $Z_L$ are also valid shares of same value over $Z_{L-1}$. This is achieved in the last step of the protocol. The final output are fresh shares of a over $Z_{L-1}$ because parties also add shares of 0.

To see the security, first observe that the only information that $P_2$ sees is $x=a+r$ (over $Z_L$). Since $$r \xleftarrow{\$} Z_L$$

and is not observed by $P_2$, some aspects have that x is uniform over $Z_L$ and so information sent to $P_2$ can be simulated by sampling $$x \xleftarrow{\$} Z_L$$

and sending shares of x from $P_j$ to $P_2$ for $j \in \{0, 1\}$. Next, the only information that $P_3$ learns is $\eta' = \eta'' \oplus (x > r)$. Now, $\eta''$ is a random bit not observed by $P_3$ and hence $\eta'$ is a uniform random bit to $P_3$. Hence, the information learned by $P_3$ can be perfectly simulated. Finally, the only information that $P_0$ and $P_1$ observe are fresh shares of the following values: $\forall i \in [l]$, $x[i]$, $\delta$, and $\eta'$ that can be perfectly simulated by sharing 0. The outputs of $P_0$ and $P_1$ are fresh shares of a over $Z_{L-1}$ as they are randomized using $u_0$ and $u_1$ respectively. Hence the security follows.

To compute MSB, Algorithm 6 describes the four party protocol realizing the functionality $F_{MSB}$ that computes the most significant bit (MSB) of a value $a \in Z_{L-1}$.

---

Algorithm 6 Compute MSB $\Pi_{MSB}(\{P_0,P_1\}, P_2, P_3)$:

---

Input: $P_0$, $P_1$ hold $\langle a\rangle_0^{L-1}$ and $\langle a\rangle_1^{L-1}$, respectively.
Output: $P_0$, $P_1$ get $\langle \text{MSB}(a)\rangle_0^B$ and $\langle \text{MSB}(a)\rangle_1^B$.
Common Randomness: $P_0$, $P_1$ hold a random bit $\beta$ and random Boolean shares of 0, denoted by $u_0$ and $u_1$ resp.
1: $P_2$ picks $r \xleftarrow{\$} Z_{L-1}$. Next, $P_2$ generates $\langle r\rangle_j^{L-1}$, $\{\langle r[i]\rangle_j^p\}_i$, $\langle r[0]\rangle_j^B$ for $j \in \{0,1\}$and sends to $P_j$.
2: For $j \in \{0,1\}$, $P_j$ computes $\langle c\rangle_j^{L-1} = 2\langle a\rangle_j^{L-1} + \langle r\rangle_j^{L-1}$.
3: $P_0$, $P_1$ reconstruct c by exchanging shares.
4: $P_0$, $P_1$, $P_3$ call $F_{PC}(\{P_0, P_1\}, P_3)$ with $P_j$,$j \in \{0, 1\}$having input $(\{\langle r[i]\rangle_j^p\}_{i\in[l]}, c, \beta)$ and $P_3$ learns $\beta'$.
5: $P_3$ generates $\langle \beta'\rangle_j^B$ and sends to $P_j$ for $j \in \{0,1\}$.
6: For $j \in \{0,1\}$, $P_j$ executes Steps 7-9.
7: $\langle \gamma\rangle_j^B = (1-j)\beta \oplus \langle \beta'\rangle_j^B$
8: $\langle \delta\rangle_j^B = c[0](1-j) \oplus \langle r[0]\rangle_j^B$
9: Output $\langle \alpha\rangle_j^B = \langle \gamma\rangle_j^B \oplus \langle \delta\rangle_j^B \oplus u_j$

---

Lemma 4. Protocol $\Pi_{MSB}(\{P_0, P_1\}, P_2, P_3)$ in Algorithm 6 securely realizes $F_{MSB}$ in the $F_{PC}$-hybrid model.

Proof. First, prove correctness of the protocol, i.e., $\alpha := \text{Reconst}^B(\langle \alpha\rangle_0^B, \langle \alpha\rangle_1^B) = \text{MSB}(a)$. Note that $\text{MSB}(a) = \text{LSB}(2a \bmod L-1)$ because $L-1$ is odd. Hence, it suffices to compute LSB(2a).

Let $c := \text{Reconst}^{L-1}(\langle c\rangle_0^{L-1}, \langle c\rangle_1^{L-1}) = 2a + r$. Now, if $\text{wrap}(2a, r, L-1)=0$, then $\text{LSB}(2a) = r[0] \oplus c[0]$. Else, $\text{LSB}(2a) = 1 \oplus r[0] \oplus c[0]$. That is, $\text{LSB}(2a) = \text{wrap}(2a, r, L-1) \oplus r[0] \oplus c[0]$. Below, is a proof that the protocol computes the quantity on the right.

Now, from correctness of $F_{PC}$, $\beta = \beta \oplus (r > c)$. Next, $\gamma := \text{Reconst}^B(\langle \gamma\rangle_0^B, \langle \gamma\rangle_1^B) = \beta \oplus \beta' = (r > c) = \text{wrap}(2a, r, L-1)$. Also, $\delta := \text{Reconst}^B(\langle \delta\rangle_0^B, \langle \delta\rangle_1^B) = r[0] \oplus c[0]$. Finally, $\alpha = \gamma \oplus \delta = \text{wrap}(2a; r; L-1) \oplus r[0] \oplus c[0]$ as required.

Next, is a proof of security of the protocol. Parties $P_0$ and $P_1$ learn the following information: $2a+r$ (from Step 2), $\langle r\rangle_j^{L-1}, \{\langle r[i]\rangle_j^P\}i, \langle r[0]\rangle_j^B$ (Step 1) and $\langle \beta'\rangle_j^B$ (Step 5). However, these are all fresh shares of these values and hence can be perfectly simulated by sending random fresh share of 0. Finally, $P_j$ outputs a fresh share of MSB(a) as the share is randomized with uj. $P_2$ receives no information in the protocol and hence, security against $P_2$ trivially holds. The only information that $P_3$ learns is bit β'. However, $\beta'=\beta\oplus(r>c)$, where β is a random bit unknown to $P_3$. Hence, the distribution of β' is uniformly random from $P_3$'s view and hence the information learned by $P_3$ can be perfectly simulated. Hence the proof.

For select share, Algorithm 7 describes the four party protocol where based on a selection bit α, parties $P_0$, $P_1$ get shares of 0 or shares of a. At start of the protocol, the selection bit α and value a is secret shared between parties $P_0$ and $P_1$.

---

Algorithm 7 SelectShare $\Pi_{ss}(\{P_0, P_1\}, P_2, P_3)$:

---

Input: $P_0$, $P_1$ hold$(\langle a\rangle_0^B \langle a\rangle_0^L)$ and $(\langle a\rangle_1^B, \langle a\rangle_1^L)$ respectively.
Output: $P_0$, $P_1$ get $\langle \alpha a\rangle_0^L$ and $\langle \alpha a\rangle_1^L$.
Common Randomness: $P_0$, $P_1$ hold a random bit β. $P_2$ and $P_3$ hold a pair.
of shares of 0 over $Z_L$, i.e., $P_2$ holds $x_2$, $y_2$ and $P_3$ holds $x_1$, $y_1$.
Additionally, $P_0$ and $P_1$ hold shares of 0 over $Z_L$ denoted by $w_0$ and $w_1$.
1: For $j \in \{0,1\}$, $P_j$ executes Steps 2-3
2: Send $\langle e\rangle_{j+2}^L = L - \langle a\rangle_j^L$ to $P_{j+2}$.
3: Send $\langle \gamma\rangle_j^B = ((1 - j)\ \beta) \oplus \langle \alpha\rangle_j^B$ to parties $P_2$, $P_3$.
4: Parties $P_2$, $P_3$ reconstruct γ.
5: $P_2$ computes $\langle e\rangle_2^L + x_0$ and $P_3$ computes $\langle e\rangle_3^L + x_1$.
6: if γ = 0 then
7: For $j \in \{2, 3\}$, $P_j$ sets $\langle u\rangle_j^L = \langle e\rangle_j^L$ and $\langle v\rangle_j^L = y_j$.
8: else
9: For $j \in \{2, 3\}$, $P_j$ sets $\langle u\rangle_j^L = y_j$ and $\langle v\rangle_j^L = \langle e\rangle_j^L$.
10: end if
11: $P_2$ sends $\langle u\rangle_2^L, \langle v\rangle_2^L$ to $P_0$ & $P_3$ sends $\langle u\rangle_3^L, \langle v\rangle_3^L$ to $P_1$.
12: For $j \in \{0,1\}$, party $P_j$ outputs
$\langle c\rangle_j^L = \langle a\rangle_j^L + (1 - \beta)\langle u\rangle_{j+2}^L + \beta\langle v\rangle_j^{L+2} + w_j$.

---

Lemma 5. Protocol $\Pi_{SS}(\{P_0, P_1\}, P_2, P_3)$ in Algorithm 7 securely realizes $F_{SS}$.

Proof. First prove correctness, i.e., $c{:=}\mathrm{Reconst}^L(\langle c\rangle_0^L, \langle c\rangle_1^L)=\alpha\cdot a$. Let a, α, γ, e, u, v be the reconstructed values from the corresponding shares. Then, in the protocol, $\gamma=a\oplus\beta$ and e=L=a.

Below is a case analysis on α and β.

α=0, β=0: In this case, γ=0, u=e and v=0. Hence, c=a+u=0=α·a.

α=0, β=1: In this case, γ=1, u=0 and v=e. Hence, c=a+v=0=α·a.

α=1, β=0: In this case, γ=1, u=0 and v=e. Hence, c=a+u=a=α·a.

α=1, β=1: In this case, γ=0, u=e and v=0.

Hence, c=a+v=a=α·a.

To see the security, first observe that the only information that $P_2$ and $P_3$ receive are γ and a share of e=2L−a=−a ($P_2$'s share is $\langle e\rangle_2^L$ and $P_3$'s share is $\langle e\rangle_3^L$). Security against $P_2$ or $P_3$ holds because the share of −a reveals no information (and can be simulated through a sharing of 0), while $\gamma=\alpha\oplus\beta$, where β is a uniform random bit unknown to both $P_2$ and $P_3$. This means that γ is uniformly distributed for $P_2$ and $P_3$. To see why security holds against $P_0$ or $P_1$, observe that $P_0$ receives $\langle u\rangle_2^L, \langle v\rangle_2^L$, which are both fresh shares of either the pair (−a, 0) or the pair (0,−a) (depending on bit γ) and can be simulated with fresh shares of (0, 0) (a similar argument holds for $P_1$). Hence, security holds.

For the derivative of Relu, Algorithm 8 describes the four party protocol for realizing the functionality $F_{DRELU}$ that computes the derivative of Relu, Relu', at a. Note that Relu'(a)=1 if MSB(a)=0, else Relu'(a)=0. Parties $P_0$, $P_1$ hold shares of a over $Z_L$ and at the end of the protocol hold shares of Relu'(a) over $Z_2$. As is clear from the function Relu' itself, the protocol computes the shares of MSB(a) and flips it to compute Relu'(a). Recall that functionality $F_{MSB}$ expects shares of a over $Z_{L-1}$. Hence, the first step of the protocol is to convert shares a over $Z_L$ to fresh shares of a over $Z_{L-1}$.

---

Algorithm 8 Relu, $\Pi_{DRELU}(\{P_0, P_1\}, P_2, P_3)$:

---

Input: $P_0$, $P_1$ hold $\langle a\rangle_0^L$ and $\langle a\rangle_1^L$, respectively.
Output: $P_0$, $P_1$ get $\langle \mathrm{Re\ lu'}(a)\rangle_0^B$ and $\langle \mathrm{Re\ lu'}(a)\rangle_1^B$
Common Randomness: $P_0$, $P_1$ hold a random Boolean shares of 0, denoted by $u_0$ and $u_1$ resp.
1: For $j \in \{0,1\}$, parties $P_j$ computes $\langle c\rangle_j^L = 2\langle a\rangle_j^L$.
2: $P_0$, $P_1$, $P_2$, $P_3$ call Fsc$(\{P_0, P_1\}, P_2, P_3)$ with $P_j$, $j \in \{0, 1\}$having input
$\langle c\rangle_j^L$ & $P_0$,
$P_1$ learn $\langle y\rangle_0^{L-1}$ & $\langle y\rangle_1^{L-1}$, resp.
3: Let α = MSB(y). $P_0$, $P_1$, $P_2$, $P_3$ call $F_{MSP}(\{P_0, P_1\}, P_2, P_3)$
with $P_j$, $j \in \{0,1\}$having input $\langle y\rangle_j^{L-1}$ & $P_0$, $P_1$ learn
$\langle \alpha\rangle_0^B$ & $\langle \alpha\rangle_1^B$, resp.
4: For $j \in \{0,1\}$,$P_j$ outputs $\langle \gamma\rangle_j^B = (1 - j) \oplus \langle \alpha\rangle_j^B \oplus u_j$.

---

Lemma 6. Protocol $\Pi_{DRELU}(\{P_0, P_1\}, P_2, P_3)$ in Algorithm 8 securely realizes $F_{DRELU}$ in the $(F_{SC}, F_{MSB})$-hybrid model for all $a\in[0,2^k]\cup[2^l-2^k,2^l-1]$, where k<l−1.

Proof. First, prove the correctness of the protocol, i.e., $\gamma{:=}\mathrm{Reconst}^B(\langle\gamma\rangle_0^B, \langle\gamma\rangle_1^B)=\mathrm{Relu'}(a)=1\oplus\mathrm{MSB}(a)$, where a is the value underlying the input shares. Note that when a belongs to the above range, MSB(a)=MSB(2a). Also, it holds that 2a≠L−1, and precondition of $F_{SC}$ is satisfied. Now, $c{:=}\mathrm{Reconst}^L(\langle c\rangle_0^L, \langle c\rangle_1^L)=2a$. From correctness of $F_{SC}$, $y{:=}\mathrm{Reconst}^{L-1}(\langle y\rangle_0^{L-1}, \langle y\rangle_1^{L-1})=2a$. Next, from correctness of $F_{MSB}$, $\alpha{:=}\mathrm{Reconst}^B(\langle\alpha\rangle_0^B, \langle\alpha\rangle_1^B)=\mathrm{MSB}(y)=\mathrm{MSB}(2a)$. Finally, $\gamma=1\oplus\alpha=1\oplus\mathrm{MSB}(a)$ as required. Also, note that $\langle\gamma\rangle_j^B$ are fresh shares of γ since both parties locally add shares of 0 to randomize the shares.

To see the security, first observe that $P_2$ and $P_3$ learn no information from the protocol (as both $F_{SC}(\{P_0, P_1\}, P_2, P_3)$ and $F_{MSB}(\{P_0, P_1\}, P_2, P_3)$ provide outputs only to $P_0$ and $P_1$). Now, $P_j$, $j\in\{0, 1\}$ only learns a fresh share of 2a (over $Z_{L-1}$) in Step 2 and a fresh Boolean share of α=MSB(2a) in Step 3 and hence any information learned by either party can be perfectly simulated through appropriate shares of 0. Finally, $P_j$ outputs a fresh share of Relu'(a) as the respective shares are randomized by $u_j$. This proves security.

For Relu, Algorithm 9 describes the four party protocol for realizing the functionality $F_{RELU}$ that computes Relu(a). Note that Relu(a)=a if MSB(a)=0, else 0. At the beginning, the parties $P_0$, $P_1$ hold shares of a over $Z_L$. At the end of the protocol, $P_0$, $P_1$ output shares of Relu(a) over $Z_L$. As is clear from Relu function, Relu(a)=Relu'(a)·a, and this is exactly what the protocol computes. In the first step, the parties $P_0$, $P_1$ compute shares of Relu'(a) and then use these and shares of a in select share functionality to learn shares of Relu'(a).

---

Algorithm 9 Relu, $\Pi_{RELU}(\{P_0, P_1\}, P_2, P_3)$:

---

Input: $P_0$, $P_1$ hold $\langle a\rangle_0^L$ and $\langle a\rangle_1^L$, respectively.
Output: $P_0$, $P_1$ get $\langle \mathrm{Re\ lu}(a)\rangle_0^L$ and $\langle \mathrm{Re\ lu}(a)\rangle_1^L$.
Common Randomness: $P_0$, $P_1$ hold random shares of 0 over $Z_L$, denoted by $u_0$ and $u_1$ resp.
1: Let α = Relu'(a). $P_0$, $P_1$, $P_2$, and $P_3$ call $F_{DRELU}(\{P_0, P_1\}, P_2, P_3)$ with $P_j$, $j \in \{0,1\}$ having input $\langle a\rangle_j^L$ and $P_0$, $P_1$, learn $\langle\alpha\rangle_0^B$ and $\langle\alpha\rangle_1^B$, resp.
2: $P_0$, $P_1$, $P_2$, and $P_3$ call $F_{SS}(\{P_0, P_1\}, P_3)$ with $P_j$, $j \in \{0, 1\}$having inut -continued Algorithm 9 Relu, $\Pi_{RELU}(\{P_0, P_1\}, P_2, P_3)$:

$(\langle\alpha\rangle_0^B, \langle a\rangle_0^L)$ and $P_0$, $P_1$ learn $\langle c\rangle_0^L$ and $\langle c\rangle_1^L$, resp.

3: For $j \in \{0,1\}$, $P_j$ outputs $\langle c\rangle_j^L + u_j$.

Lemma 7. Protocol $\Pi_{RELU}(\{P_0, P_1\}, P_2, P_3)$ in Alogrithm security realizes $F_{RELU}$ in the $(F_{SS}, F_{DRELU})$-hybrid model.

Proof. First, prove the correctness of the protocol, i.e., $c := \text{Reconst}^L(\langle c\rangle_0^L, \langle c\rangle_1^L) = \text{Relu}(a) = \text{Relu}'(a)\cdot a$, where a is the value underlying the input shares. It follows from correctness [When the functionality $F_{DRELU}$ is instantiated using protocol $\Pi_{DRELU}$, it is ensured that the conditions of Lemma 6 are met.] of $F_{DRELU}$ that $\alpha := \text{Reconst}^B(\langle\alpha\rangle_0^B, \langle\alpha\rangle_1^B) = \text{Relu}'(a)$. Now from the correctness of $F_{SS}$ it follows that $c = \alpha\cdot a$.

To argue security, observe that $P_2$ and $P_3$ learn no information from the protocol (as both $F_{DRELU}(\{P_0, P_1\}, P_2, P_3)$ and $F_{SS}(\{P_0, P_1\}, P_2, P_3)$ provide outputs only to $P_0$ and $P_1$). Now, $P_j$, $j \in \{0, 1\}$ only learns a fresh Boolean share of $\alpha = \text{Relu}'(a)$ in Step 1 and a fresh share of $\alpha a$ (over $Z_L$) in Step 2 and hence any information learned by either party can be perfectly simulated through appropriate shares of 0. Finally, $P_j$ outputs a fresh share of Relu(a) as the respective shares are randomized by $u_j$. This proves security.

Algorithm 10 describes the four party protocol realizing the functionality $F_{DIV}$ in the $(F_{DRELU}, F_{SS})$-hybrid model. Parties $P_0$, $P_1$ hold shares of x and y over $Z_L$. At the end of the protocol, parties $P_0$, $P_1$ hold shares of $\lfloor x/y\rfloor$ over $Z_L$ when $y \neq 0$.

Algorithm 10 Division: $\Pi_{DIV}(\{P_0, P_1\}, P_2, P_3)$:

Input: $P_0$, $P_1$ hold $(\langle x\rangle_0^L, \langle y\rangle_0^L)$ and $(\langle x\rangle_1^L, \langle y\rangle_1^L)$, resp.
Output: $P_0$, $P_1$ get $\langle x/y\rangle_0^L$ and $\langle x/y\rangle_1^L$.
Common Randomness: $P_j$, $j \in \{0,1\}$ hold l shares $\langle 0\rangle_j^L$ denoted by $w_{i,0}$ and $w_{i,1}$ for all $i \in [l]$ resp. They additionally also hold another share $\langle 0\rangle^L$ denoted by $s_0$ and $s_1$.
1: Set $u_l = 0$ and for $j \in \{0,1\}$, $P_j$ holds $\langle u_l\rangle_j^L$ (through the common randomness).
2; for $i = \{l-1, \ldots, 0\}$ do
3: $P_j$, $j \in \{0,1\}$ compute $\langle z_i\rangle_j^L = \langle x\rangle_j^L - \langle u_{i+1}\rangle_j^L - 2^i\langle y\rangle_j^L + w_{i,j}$.
4: $P_0$, $P_1$, $P_2$ and $P_3$ call $F_{DRELU}(\{P_0, P_1\}, P_2, P_3)$ with $P_j$, $j \in \{0,1\}$ having input $\langle z_i\rangle_j^L$ and $P_0$, $P_1$ learn $\langle\beta_i\rangle_0^B$ and $\langle\beta_i\rangle_1^B$, resp.
5: $P_0$, $P_1$, $P_2$ and $P_3$ call $F_{SS}(\{P_0, P_1\}, P_2, P_3)$ with $P_j$, $j \in \{0,1\}$ having input $(\langle\beta_i\rangle_j^B, \langle 2^i\rangle_j^L)$ and $P_0$, $P_1$ learn $\langle k_i\rangle_0^L$ and $\langle k_i\rangle_1^L$, resp.
6: $P_0$, $P_1$, $P_2$ and $P_3$ call $F_{SS}(\{P_0, P_1\}, P_2, P_3)$ with $P_j$, $j \in \{0,1\}$ having input $(\langle\beta_i\rangle_j^B, \langle 2^i y\rangle_j^L)$ and $P_0$, $P_1$ learn $\langle v_i\rangle_0^L$ and $\langle v_i\rangle_1^L$, resp.
7: For $j \in \{0,1\}$, $P_j$ computes $\langle u_i\rangle_j^L = \langle u_{i+1}\rangle_j^L + \langle v_i\rangle_j^L$.
8: end for
9: For $j \in \{0, 1\}$, $P_j$ outputs $\langle q\rangle_j^L = \sum_{i=0}^{\ell-1} \langle k_i\rangle_j^L + s_j$.

Lemma 8. Protocol $\Pi_{DIV}(\{P_0, P_1\}, P_2, P_3)$ in Algorithm 10 securely realizes $F_{DIV}$ in the $(F_{DRELU}, F_{SS})$-hybrid model when $y \neq 0$.

Proof. First prove the correctness of the protocol, i.e., $q := \text{Reconst}^L(\langle q\rangle_0^L, \langle q\rangle_1^L) = \lfloor x/y\rfloor$. The protocol mimics the standard long division algorithm and proceeds in l iterations. In the $i^{th}$ iteration some aspects compute the q[i], the $i^{th}$ bit of q starting from the most significant bit.

Below is a proof by inducting that maintains the invariant:

$$\beta_i = q[i],\ k_i = 2^i\beta_i,\ u_i = y\cdot\sum_{j=i}^{\ell-1} k_j.$$

Assume that invariAnt holds for 1>m, then it can be proven that it holds for i=m. Note that $z_m$ holds the value $(x-u_{m+1}-2^m y)$. It should be noted that $\beta_m$ or q[m] is 1 iff $x-u_{m+1}-2^m y$, that is, $\text{Relu}'(z_m)=1$. By correctness [upon instantiating the functionality of $F_{DRELU}$ using protocol $\Pi_{DRELU}$, it is ensured that the conditions of Lemma 6 are met] of $F_{DRELU}$, $\beta_m = \text{Reconst}^B(\langle\beta_m\rangle_0^B, \langle\beta_m\rangle_1^B) = \text{Relu}'(z_m)$. Next by correctness of $F_{SS}$, $k_m = \beta_m 2^m$ and $v_m = \beta_m\cdot 2^m y = k_m y$ . Hence, $$u_m = u_{m+1} + v_m = y\cdot\sum_{j=m}^{\ell-1} k_j.$$

To argue security, first observe that $P_2$ and $P_3$ learn no information from the protocol (as both $F_{DRELU}(\{P_0, P_1\}, P_2, P_3)$ and $F_{SS}(\{P_0, P_1\}, P_2, P_3)$ provide outputs only to $P_0$ and $P_1$). Now, $P_j$, $j \in \{0, 1\}$ only learn fresh shares of the outputs in Step 4, 5 and 6 and hence any information learned by either party can be perfectly simulated through appropriate shares of 0 (over $Z_B$, $Z_L$ and $Z_L$ resp.). Finally, $P_j$ outputs a fresh share of the final output in Step 9 as the respective shares are randomized by $s_j$. This proves security.

It can be easily seen that one can construct a secure four-party protocol for the functionality in Algorithm 1 using the functionalities (and in turn protocols) of $F_{MATMUL}$, $F_{DRELU}$, $F_{RELU}$ and $F_{DIV}$.

In some cases, the technology described herein may be implemented in C++. The ring size may be set to $Z_{2^{64}}$ and the uint64_t native C++ datatype may be used for all variables. Compared to using a field for the underlying protocols or using dedicated number theoretic libraries, this has the benefit of implementing modulo operations for free and hence the implementation is extremely fast. The code may be built on standard C++ libraries.

Some aspects develop new four-party information-theoretically secure protocol for DNN training and prediction such that no single party learns any information about the data. Some aspects may obtain two orders of magnitude improvements over previous state-of-the-art protocols for the same network settings. Some of the techniques disclosed herein may be used to implemented other more sophisticated networks.

Numbered Examples

Certain embodiments are described herein as numbered examples 1, 2, 3, etc. These numbered examples are provided as examples only and do not limit the subject technology.

Example 1 is a method comprising: storing first private values at a first machine and second private values at a second machine; providing, to a third machine, a first share of the first private values and a first share of the second private values; providing, to a fourth machine, a second share of the first private values and a second share of the second private values; computing, at the third machine, a third machine value based on the first share of the first private values and the first share of the second private values; computing, at the fourth machine, a fourth machine value based on the second share of the first private values and the second share of the second private values; providing, to the first machine and the second machine, the third machine value and the fourth machine value; computing, at the first machine, a mathematical function of the first private values and the second private values, the mathematical function being computed based on the first private values stored at the first machine, the third machine value, and the fourth machine value; and providing an output of the computed mathematical function.

In Example 2, the subject matter of Example 1 includes, computing, at the second machine, the mathematical function of the first private values and the second private values, the mathematical function being computed based on the second private values stored at the second machine, the third machine value, and the fourth machine value.

In Example 3, the subject matter of Example 2 includes, wherein the second machine lacks access to the first private values stored at the first machine.

In Example 4, the subject matter of Examples 1-3 includes, wherein the first machine lacks access to the second private values stored at the second machine.

In Example 5, the subject matter of Examples 1-4 includes, wherein the first private values are constructible based on the first share of the first private values and the second share of the first private values, and wherein the second private values are constructible based on the first share of the second private values and the second share of the second private values.

In Example 6, the subject matter of Example 5 includes, wherein the first private values comprise an additional mathematical function of the first share of the first private values and the second share of the first private values, and wherein the second private values comprise the additional mathematical function of the first share of the second private values and the second share of the second private values.

In Example 7, the subject matter of Example 6 includes, wherein the additional mathematical function comprises a sum.

Example 8 is a system comprising: processing circuitry of one or more machines; and one or more memories storing instructions which, when executed by the processing circuitry, cause the processing circuitry to perform operations comprising: storing, at a first machine, a first share of a first matrix and a first share of a second matrix; computing, at the first machine, a first machine product of the first share of the first matrix and the first share of the second matrix; storing, at a second machine, a second share of the first matrix and a second share of the second matrix; computing, at the second machine, a second machine product of the second share of the first matrix and the second share of the second matrix; providing, to a third machine, the first share of the first matrix and the second share of the second matrix; computing, at the third machine, a third machine product of the first share of the first matrix and the second share of the second matrix; providing, to a fourth machine, the second share of the first matrix and the first share of the second matrix; computing, at the fourth machine, a fourth machine product of the second share of the first matrix and the first share of the second matrix; computing a matrix product of the first matrix and the second matrix based on the first machine product, the second machine product, the third machine product, and the fourth machine product; and providing an output representing the matrix product.

In Example 9, the subject matter of Example 8 includes, wherein the first matrix is constructible based on the first share of the first matrix and the second share of the first matrix, and wherein the second matrix is constructible based on the first share of the second matrix and the second share of the second matrix.

In Example 10, the subject matter of Example 9 includes, wherein the first matrix comprises a mathematical function of the first share of the first matrix and the second share of the first matrix, and wherein the second matrix comprises the mathematical function of the first share of the second matrix and the second share of the second matrix.

In Example 11, the subject matter of Example 10 includes, wherein the mathematical function comprises a sum.

In Example 12, the subject matter of Examples 8-11 includes, wherein at least one of the first machine, the second machine, the third machine, and the fourth machine comprises a physical server or a physical data storage unit.

In Example 13, the subject matter of Examples 8-12 includes, wherein at least one of the first machine, the second machine, the third machine, and the fourth machine comprises a virtual machine.

Example 14 is one or more non-transitory machine-readable media storing instructions which, when executed by processing circuitry of one or more machines, cause the processing circuitry to perform operations comprising: storing first private values at a first machine and second private values at a second machine; providing, to a third machine, a first share of the first private values and a first share of the second private values; providing, to a fourth machine, a second share of the first private values and a second share of the second private values; computing, at the third machine, a third machine value based on the first share of the first private values and the first share of the second private values; computing, at the fourth machine, a fourth machine value based on the second share of the first private values and the second share of the second private values; providing, to the first machine and the second machine, the third machine value and the fourth machine value; computing, at the first machine, a mathematical function of the first private values and the second private values, the mathematical function being computed based on the first private values stored at the first machine, the third machine value, and the fourth machine value; and providing an output of the computed mathematical function.

In Example 15, the subject matter of Example 14 includes, the operations further comprising: computing, at the second machine, the mathematical function of the first private values and the second private values, the mathematical function being computed based on the second private values stored at the second machine, the third machine value, and the fourth machine value.

In Example 16, the subject matter of Example 15 includes, wherein the second machine lacks access to the first private values stored at the first machine.

In Example 17, the subject matter of Examples 14-16 includes, wherein the first machine lacks access to the second private values stored at the second machine.

In Example 18, the subject matter of Examples 14-17 includes, wherein the first private values are constructible based on the first share of the first private values and the second share of the first private values, and wherein the second private values are constructible based on the first share of the second private values and the second share of the second private values.

In Example 19, the subject matter of Example 18 includes, wherein the first private values comprise an additional mathematical function of the first share of the first private values and the second share of the first private values, and wherein the second private values comprise the additional mathematical function of the first share of the second private values and the second share of the second private values.

In Example 20, the subject matter of Example 19 includes, wherein the additional mathematical function comprises a sum.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Components and Logic

Certain embodiments are described herein as including logic or a number of components or mechanisms. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

In some embodiments, a hardware component may be implemented mechanically, electronically, or any suitable combination thereof. For example, a hardware component may include dedicated circuitry or logic that is permanently configured to perform certain operations. For example, a hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

Accordingly, the phrase "hardware component" should be understood to encompass a tangible record, be that an record that is physically constructed, permanently configured (e.g., hardwired), or temporarily configured (e.g., programmed) to operate in a certain manner or to perform certain operations described herein. As used herein, "hardware-implemented component" refers to a hardware component. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors.

Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

Example Machine and Software Architecture

The components, methods, applications, and so forth described in conjunction with FIGS. 1-3 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internet of things," while yet another combination produces a server computer for use within a cloud computing architecture. Not all combinations of such software and hardware architectures are presented here, as those of skill in the art can readily understand how to implement the disclosed subject matter in different contexts from the disclosure contained herein.

Figure 4:
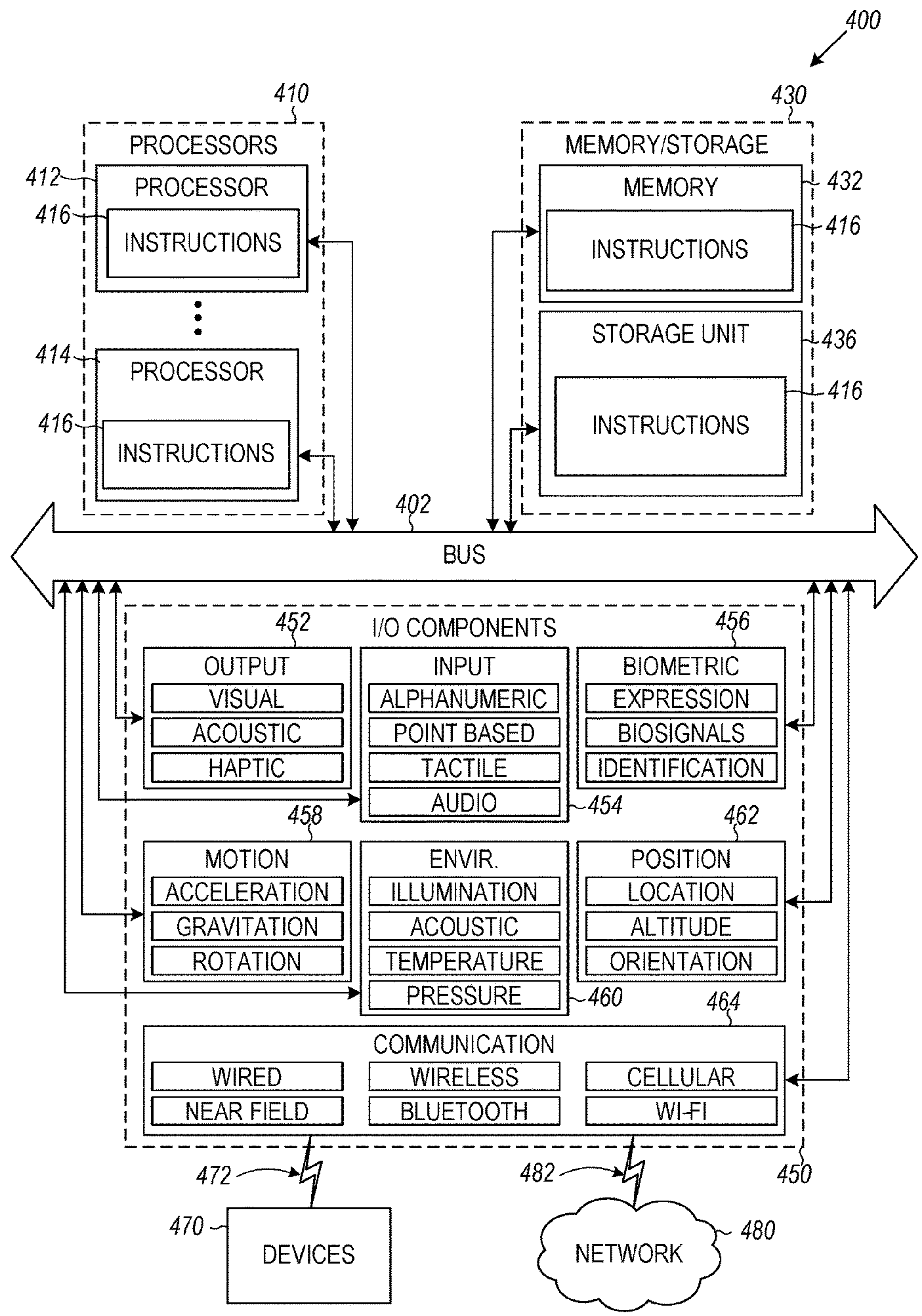
FIG. 4 is a block diagram illustrating components of a machine able to read instructions from a machine-readable medium and perform any of the methodologies discussed herein, in accordance with some embodiments.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. The instructions 416 transform the general, non-programmed machine into a particular machine programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, PC, a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein.

The machine 400 may include processors 410, memory/storage 430, and I/O components 450, which may be configured to communicate with each other such as via a bus 402. In an example embodiment, the processors 410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 412 and a processor 414 that may execute the instructions 416. The term "processor" is intended to include multi-core processors that may comprise two or more independent processors (sometimes referred to as "cores") that may execute instructions contemporaneously. Although FIG. 4 shows multiple processors 410, the machine 400 may include a single processor with a single core, a single processor with multiple cores (e.g., a multi-core processor), multiple processors with a single core, multiple processors with multiples cores, or any combination thereof.

The memory/storage 430 may include a memory 432, such as a main memory, or other memory storage, and a storage unit 436, both accessible to the processors 410 such as via the bus 402. The storage unit 436 and memory 432 store the instructions 416 embodying any one or more of the methodologies or functions described herein. The instructions 416 may also reside, completely or partially, within the memory 432, within the storage unit 436, within at least one of the processors 410 (e.g., within the processor's cache memory), or any suitable combination thereof, during execution thereof by the machine 400. Accordingly, the memory 432, the storage unit 436, and the memory of the processors 410 are examples of machine-readable media.

As used herein, "machine-readable medium" means a device able to store instructions (e.g., instructions 416) and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 416. The term "machine-readable medium" shall also be taken to include any medium, or combination of multiple media, that is capable of storing instructions (e.g., instructions 416) for execution by a machine (e.g., machine 400), such that the instructions, when executed by one or more processors of the machine (e.g., processors 410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 450 may include a wide variety of components to receive input, provide output, produce output, transmit information, exchange information, capture measurements, and so on. The specific I/O components 450 that are included in a particular machine will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 4. The I/O components 450 are grouped according to functionality merely for simplifying the following discussion and the grouping is in no way limiting. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

The input components 454 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 450 may include biometric components 456, motion components 458, environmental components 460, or position components 462, among a wide array of other components. For example, the biometric components 456 may include components to detect expressions (e.g., hand expressions, facial expressions, vocal expressions, body gestures, or eye tracking), measure biosignals (e.g., blood pressure, heart rate, body temperature, perspiration, or brain waves), measure exercise-related metrics (e.g., distance moved, speed of movement, or time spent exercising) identify a person (e.g., voice identification, retinal identification, facial identification, fingerprint identification, or electroencephalogram based identification), and the like. The motion components 458 may include acceleration sensor components (e.g., accelerometer), gravitation sensor components, rotation sensor components (e.g., gyroscope), and so forth. The environmental components 460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or other suitable device to interface with the network 480. In further examples, the communication components 464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 470 may be another machine or any of a wide variety of peripheral devices (e.g., a peripheral device coupled via a USB).

Moreover, the communication components 464 may detect identifiers or include components operable to detect identifiers. For example, the communication components 464 may include Radio Frequency Identification (RFID) tag reader components, NFC smart tag detection components, optical reader components, or acoustic detection components (e.g., microphones to identify tagged audio signals). In addition, a variety of information may be derived via the communication components 464, such as location via Internet Protocol (IP) geolocation, location via Wi-Fi® signal triangulation, location via detecting an NFC beacon signal that may indicate a particular location, and so forth.

In various example embodiments, one or more portions of the network 480 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 480 or a portion of the network 480 may include a wireless or cellular network and the coupling 482 may be a Code Division Multiple Access (CDMA) connection, a Global System for Mobile communications (GSM) connection, or another type of cellular or wireless coupling. In this example, the coupling 482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 4G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 416 may be transmitted or received over the network 480 using a transmission medium via a network interface device (e.g., a network interface component included in the communication components 464) and utilizing any one of a number of well-known transfer protocols (e.g., HTTP). Similarly, the instructions 416 may be transmitted or received using a transmission medium via the coupling 472 (e.g., a peer-to-peer coupling) to the devices 470. The term "transmission medium" shall be taken to include any intangible medium that is capable of storing, encoding, or carrying the instructions 416 for execution by the machine 400, and includes digital or analog communications signals or other intangible media to facilitate communication of such software.

What is claimed is:

1. A method comprising:

storing first private values at a first machine and second private values at a second machine;

providing, to a third machine, a first share of the first private values and a first share of the second private values;

providing, to a fourth machine, a second share of the first private values and a second share of the second private values;

computing, at the third machine, a third machine value based on the first share of the first private values and the first share of the second private values;

computing, at the fourth machine, a fourth machine value based on the second share of the first private values and the second share of the second private values;

providing, to the first machine and the second machine, the third machine value and the fourth machine value;

computing, at the first machine, a mathematical function of the first private values and the second private values, the mathematical function being computed based on the first private values stored at the first machine, the third machine value, and the fourth machine value; and providing an output of the computed mathematical function.

2. The method of claim 1, further comprising:

computing, at the second machine, the mathematical function of the first private values and the second private values, the mathematical function being computed based on the second private values stored at the second machine, the third machine value, and the fourth machine value.

3. The method of claim 2, wherein the second machine lacks access to the first private values stored at the first machine.

4. The method of claim 1, wherein the first machine lacks access to the second private values stored at the second machine.

5. The method of claim 1, wherein the first private values are constructible based on the first share of the first private values and the second share of the first private values, and wherein the second private values are constructible based on the first share of the second private values and the second share of the second private values.

6. The method of claim 5, wherein the first private values comprise an additional mathematical function of the first share of the first private values and the second share of the first private values, and wherein the second private values comprise the additional mathematical function of the first share of the second private values and the second share of the second private values.

7. The method of claim 6, wherein the additional mathematical function comprises a sum.

8. One or more non-transitory machine-readable media storing instructions which, when executed by processing circuitry of one or more machines, cause the processing circuitry to perform operations comprising:

storing first private values at a first machine and second private values at a second machine;

providing, to a third machine, a first share of the first private values and a first share of the second private values;

providing, to a fourth machine, a second share of the first private values and a second share of the second private values;

computing, at the third machine, a third machine value based on the first share of the first private values and the first share of the second private values;

computing, at the fourth machine, a fourth machine value based on the second share of the first private values and the second share of the second private values;

providing, to the first machine and the second machine, the third machine value and the fourth machine value;

computing, at the first machine, a mathematical function of the first private values and the second private values, the mathematical function being computed based on the first private values stored at the first machine, the third machine value, and the fourth machine value; and providing an output of the computed mathematical function.

9. The one or more machine-readable media of claim 8, the operations further comprising:

computing, at the second machine, the mathematical function of the first private values and the second private values, the mathematical function being computed based on the second private values stored at the second machine, the third machine value, and the fourth machine value.

10. The one or more machine-readable media of claim 9, wherein the second machine lacks access to the first private values stored at the first machine.

11. The one or more machine-readable media of claim 8, wherein the first machine lacks access to the second private values stored at the second machine.

12. The one or more machine-readable media of claim 8, wherein the first private values are constructible based on the first share of the first private values and the second share of the first private values, and wherein the second private values are constructible based on the first share of the second private values and the second share of the second private values.

13. The one or more machine-readable media of claim 12, wherein the first private values comprise an additional mathematical function of the first share of the first private values and the second share of the first private values, and wherein the second private values comprise the additional mathematical function of the first share of the second private values and the second share of the second private values.

14. The one or more machine-readable media of claim 13, wherein the additional mathematical function comprises a sum.

* * * * *